US006631386B1

(12) United States Patent
Arun et al.

(10) Patent No.: US 6,631,386 B1
(45) Date of Patent: Oct. 7, 2003

(54) DATABASE VERSION CONTROL SUBSYSTEM AND METHOD FOR USE WITH DATABASE MANAGEMENT SYSTEM

(75) Inventors: Gopalan Arun, Nashua, NH (US); Ramesh Vasudevan, Burlington, MA (US); Jayanta Banerjee, Nashua, NH (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/557,923

(22) Filed: Apr. 22, 2000

(51) Int. Cl.[7] .......................... G06F 17/30; G06F 17/00
(52) U.S. Cl. ............................ 707/203; 707/5; 715/511
(58) Field of Search ................................ 707/1–5, 203, 707/501.1, 511; 717/101, 120, 170; 715/501.1, 511

(56) References Cited

U.S. PATENT DOCUMENTS 4,558,413 A * 12/1985 Schmidt et al. ............. 364/300
5,903,897 A * 5/1999 Carrier, III et al. ......... 707/203
6,085,191 A * 7/2000 Fisher et al. ................... 707/9
6,397,228 B1 * 5/2002 Lamburt et al. ............. 707/203

* cited by examiner

Primary Examiner—Alford Kindred
(74) Attorney, Agent, or Firm—Ditthavong & Carlson, P.C.

(57) ABSTRACT

A version control system is described for use in connection with a database management system to facilitate versioning of a database table, the system including a database table and a version control module. The database table comprises a plurality of records, each record including at least one data field for storing user data and at least some of the records including a version control field including version control information. The version control module is configured to, in response to a user query related to the database table and related to a version, generate an augmented query for processing by the data base management system, the augmented query relating to the user query and the version control information. The version control module facilitates association of versions of the database with respective ones of a hierarchy of states and allows conflicts therebetween to be resolved, data to be posted from child states to respective parent states in the hierarchy, and referential constraints between tables to be preserved.

23 Claims, 19 Drawing Sheets

| | USER DATA FIELDS | | VERSION MANAGEMENT FIELDS | | | | |
|---|---|---|---|---|---|---|---|
| | FIELD 21(1) | FIELD 21(J) | VER ID FIELD 22 | NXT VER ID FIELD 23 | SYNC FIELD 24 | LOCKS FIELD 25 | DEL FLAG 26 |
| ROW 20(1) | | | | | | | |
| ROW 20(2) | | | | | | | |
| ROW 20(3) | | | | | | | |
| ROW 20(4) | | | | | | | |
| ... | | | | | | | |
| ROW 20(I-2) | | | | | | | |
| ROW 20(I-1) | | | | | | | |
| ROW 20(I) | | | | | | | |

DATABASE TABLE 13n

*FIG. 2*

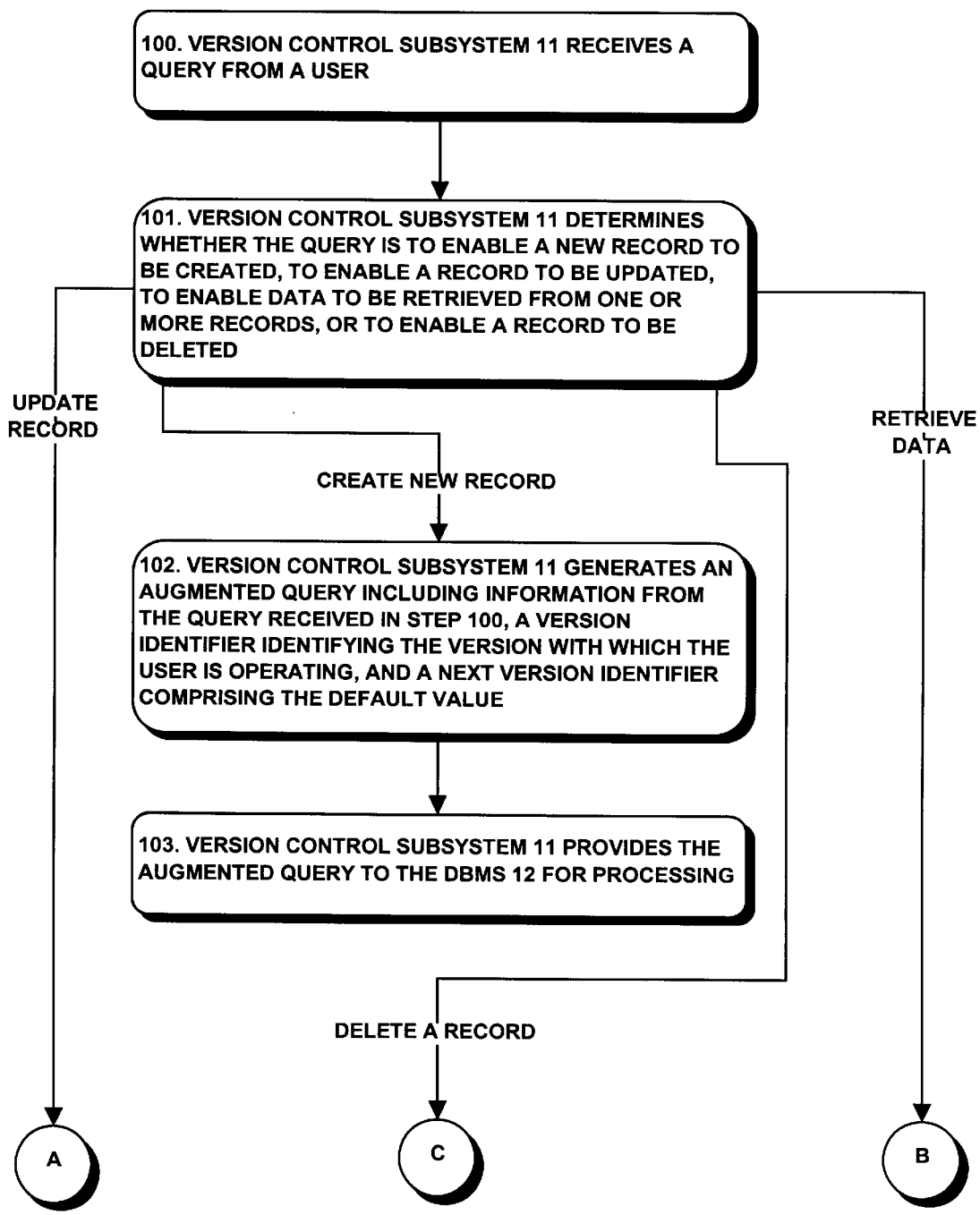

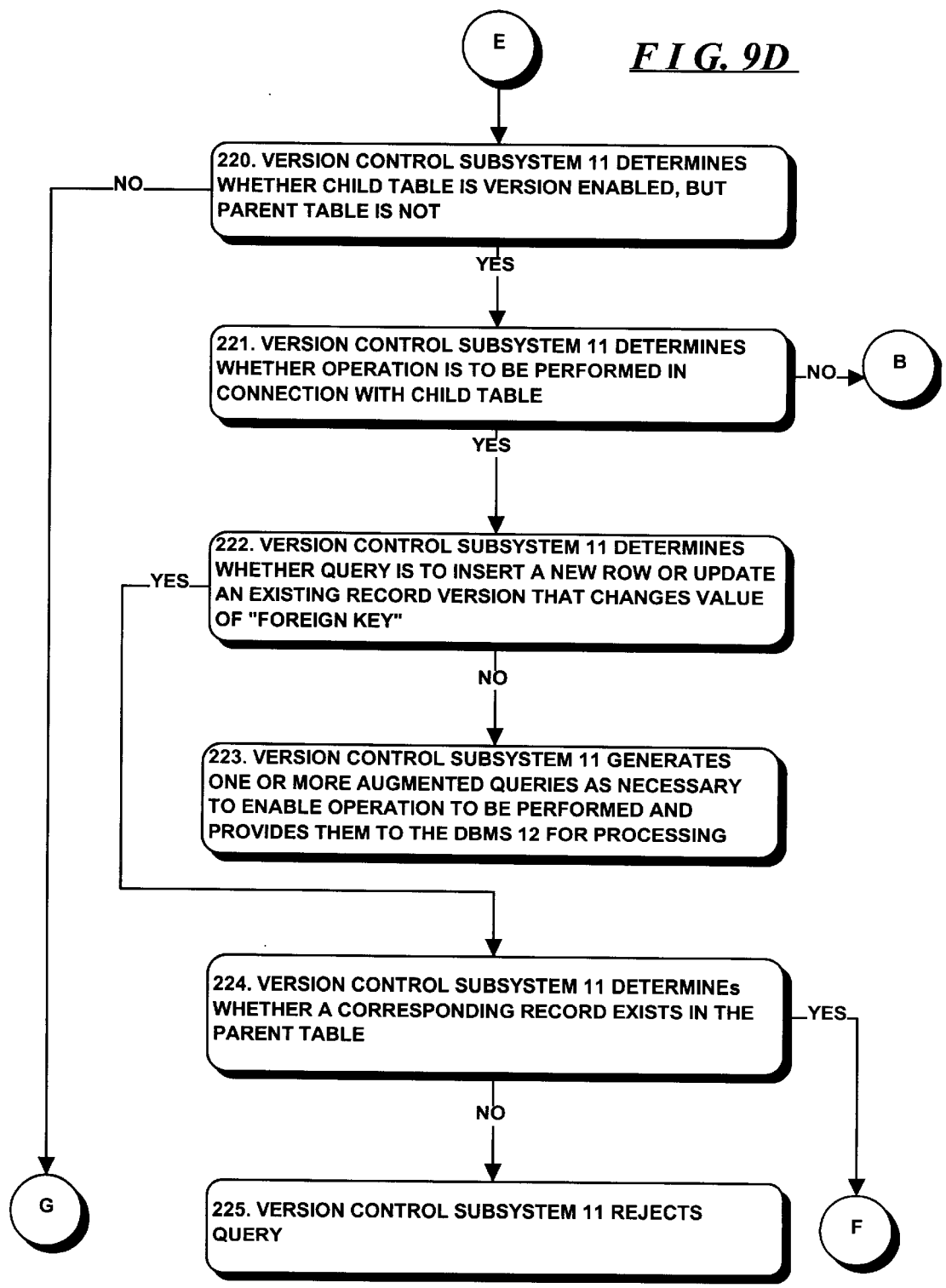

DATABASE VERSION CONTROL SUBSYSTEM AND METHOD FOR USE WITH DATABASE MANAGEMENT SYSTEM

FIELD OF THE INVENTION

The invention relates generally to the field of digital data processing systems, and more particularly to data base management systems (DBMS's). The invention specifically provides a database version control subsystem for use in connection with a DBMS to facilitate versioning of a database.

BACKGROUND OF THE INVENTION

Databases are generally used to store large amounts of information in a structured manner for subsequent retrieval and processing. Databases, in turn, are managed by data base management systems (DBMS's). A DBMS allows one to submit a query identifying a number of criteria for the information that is to be retrieved from the database. Queries may be submitted by a user, in which case the DBMS can return the subset of information stored in the database that conforms to that identified by the query for, for example, display to the user. Alternatively, queries may be submitted by an application program, in which case the DBMS can return the information to the application program for processing. The DBMS can also receive information from an user or application program for storage in the database, and the DBMS can, after receiving the information, use the information to update the database.

In one type of DBMS, generally referred to as a relational database system, information is stored in tables, with each table comprising a two-dimensional array organized a plurality of rows and columns. Information stored in a relational database system is in the form of records, with each record comprising one or more fields each associated with an attribute. For example, an organization such as a company or a government agency might maintain a database identifying its employees, and in that case each record may be associated with each employee, with attributes including information such as an employee number, name, address, department, office location, salary, date of hire, tax information and other information that the organization would deem useful in managing its employees. Similarly, a member ship organization such-as a club or an association may maintain a database identifying its members, and attributes may include information such as a member number, name, address, membership classification if the organization has various classes of membership, renewal data, and other information that the organization would deem useful. In a table in a relational database system, the attributes associated with the records are stored in the same order, so that for all records the "j-th" field will be associated with the same attribute. Generally, information from one or a combination of predetermined ones of the attributes of each record will be selected to comprise a record "key," whose value is used to uniquely identify the respective record.

Database queries issued by an user or an application program can be based on any attribute, including but not limited to the attributes selected to define the record keys. A query can, for example, ask for information from a record or records having a particular key value, set of key values or range of key values, in which case the DBMS will return information from the records, if any, whose key value or values correspond to those set forth in the query. Similarly, a query can ask for information from records based on criteria relating to the other attributes, in which case the, DBMS will return information from the records, if any, whose attributes contain the value or values that correspond to those set forth in the query. In addition, a query can ask the DBMS to establish a new record, in which case the DBMS will add a row to the table in which information for the record can be stored; the information to be stored in the new record may be provided with the query or in a later query. A query can ask the DBMS to update one or more records, in which case the query will identify the records to be updated, in a manner similar to that described above for a retrieval, and the information to be used in the update; in response to such a query, the DBMS will use the information contained in the query to update the identified records. Alternatively, a query can ask the DBMS to delete one or more re cords, in which case the DBMS will delete the records; the records to be deleted can be identified in the query in a similar manner to that described above for a retrieval.

In many kinds of applications, it is desirable to allow a user to make use of one or more tables, or portions thereof, of a database as they exist at a particular point in time and update the information therein, with the updates not being visible to other users while the information is being updated. Currently, that is accomplished by means of a check-out/check-in scheme. In such a scheme, a user "checks out" the database table or tables, or portions thereof, (hereinafter "tables"), that he or she wishes to use, after which the DBMS makes a copy of the tables that have been checked out, from the original "live" database. Thereafter, the user can operate with the copy, updating the information in his or her copy as appropriate. While the one user is operating with his or her copy, other users can use the live database, updating the information therein, including information in the tables that have been checked out. When the user has finished, he or she can check the checked-out portion back into the database, in the process updating the live database as necessary. For example, for a database that is used in connection with a computer-assisted design project, a user working on one aspect of a design may wish to check out a portion of the database reflecting that aspect at one point in the design process, make changes to the design, and, if and when he or she is satisfied with the changes, update the database with the changes. As a specific example, if the live database is used in connection with design of an airport, a user may which to check out a portion of the database reflecting the design of a terminal or a particular facility of a terminal, such as electric power distribution, water distribution, heating, ventilation and air conditioning ("HVAC"), or other systems. Similarly, for a database relating to structure of a company, a user who wishes to re-structure a portion of the company may wish to check out a portion of the database reflecting the portion that he or she wishes to restructure.

There are a number of deficiencies with check-out/check-in schemes. For example, since, in check-out/check-in schemes, copies are made of the live database, a relatively large amount of storage may be required, particularly if a number of users have checked out tables from the database. In addition, check-out/check-in schemes typically do not allow tables to be checked out from a checked-out copy, that is, they do not provide a hierarchical check-out scheme. Using the above example in which a database is used in connection with design of an airport, if a user checks out a portion of the live database relating to a terminal, check-out/check-in arrangements do not allow, a user to thereafter check out a portion of the database relating to a particular facility of the terminal from the checked-out portion. Accordingly, if a user wishes to check out tables from a checked out copy, he or she will first need to check the copy back in again.

In addition, typically in a check-out/check in scheme, when a user modifies a record in the a table of a live database after the table has been checked-out therefrom and before it is checked back in, a conflict will exist as between the copy of the record in the checked-out copy and the copy of the record in the live database. In that case, the conflict will not be discovered until the checked-out copy is checked back in again. Typically, a user who is using the checked-out copy will not discover that a record has been modified in the live database, and, similarly, the user who is using the live database will not discover that a record has been modified in the checked-out copy, until the checked out copy is checked in. As part of the check-in operation, a conflict resolution operation is performed during which the user who is checking the copy back in will determine which of the copies of the record is to survive in the live database. A problem can arise in that, if the copy has been checked out for some time, a number of conflicts might exist which will need to be resolved, which conflicts will represent wasted effort since only one record, the record from the copy or the record from the live database, will survive after the conflict resolution operation.

Furthermore, in a check-out/check-in scheme it is typically difficult for two users to collaborate using the checked-out tables. This results from the fact that, in a check-out/check-in scheme, usually the checked out tables are in the form of files. In that case, when one user is using a file, the file will be locked and unavailable to other users, particularly if the other users wish to make updates thereto,

SUMMARY OF THE INVENTION

The invention provides a new and improved database version control subsystem for use in connection with a database management system that allows a user to make use of a database In brief summary, the invention in one aspect provides a version control system for use in connection with a database management system to facilitate versioning of a database table, the system including a database table and a version control module. The database table comprises a plurality of records, each record including at least one data field for storing user data and at least some of the records including a version control field including version control information. The version control module is configured to, in response to a user query related to the database table and related to a version, generate an augmented query for processing by the data base management system, the augmented query relating to the user query and the version control information.

In another aspect, the invention provides a computer program product for use in connection with a computer to provide a version control system for use in connection with a database management system to facilitate versioning of a database table. The database table comprises a plurality of records, each record including at least one data field for storing user data and at least some of the records including a version control field including version control information. The computer program product comprises a machine-readable medium having encoded thereon a user query receiver module and a version control module. The user query receiver module is configured to enable the computer to receive a user query related to the database table and related to a version. The version control module is configured to enable the computer to, in response to the user query, generate an augmented query for processing by the data base management system, the augmented query relating to the user query and the version control information.

In yet another aspect, the invention provides a method for use in connection with a database management system to facilitate versioning of a database table. The database table comprises a plurality of records, each record including at least one data field for storing user data and at least some of the records including a version control field including version control information. The method comprising a user query receiving step and a version control step. In the user query receiving step, a user query related to the database table and related to a version is received. In the version control step, in response to receipt of the user query, an augmented query for processing by the data base management system is generated, the augmented query relating to the user query and the version control information.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 depicts details of a database table used by the version control subsystem depicted in FIG. 1;

DETAILED DESCRIPTION OF AN ILLUSTRATIVE EMBODIMENT

Figure 1:
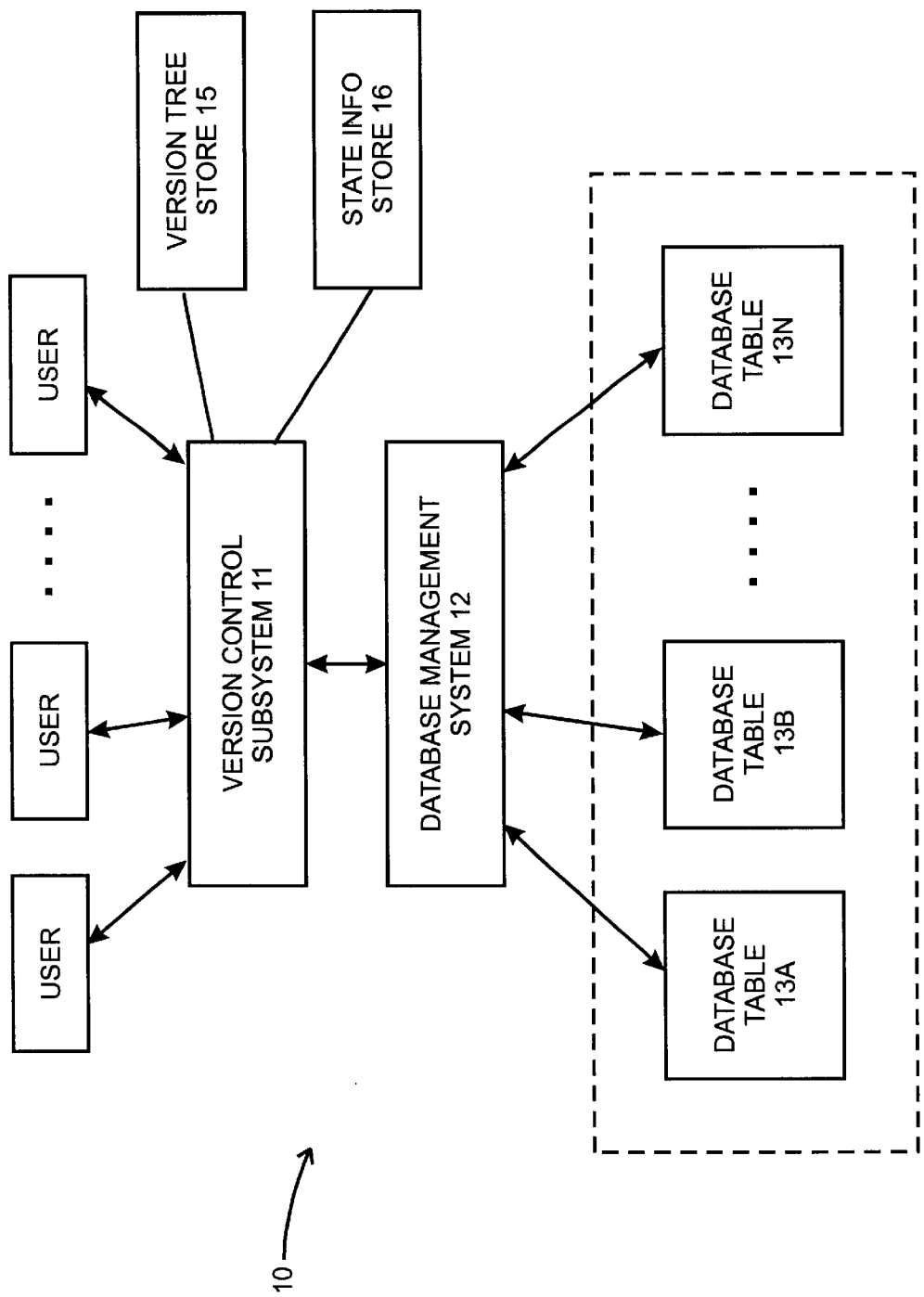
FIG. 1 is a functional block diagram of a system including a database version control subsystem constructed in accordance with the invention.

FIG. 1 is a functional block diagram of a system 10 including a database version control system 11 constructed in accordance with the invention. With reference to FIG. 1, the system 10 includes, in addition, to the database version control system, a conventional database management system (DBMS) 12 and a database 13 consisting of one or more tables 13A, . . . , 13N (generally 13n). The database tables 13n store data that may be retrieved by the DBMS 12 in response to queries from one or more users, generally identified by reference numeral 14. In addition, the DBMS 12 may, in response to queries from the users 14, update the data stored in the database 13. The data in the database tables 13n are typically stored in the form of records, and a query may enable one or more records to be added to one or more database tables 13n in the database 13, data in one or more records to be updated in one or more database tables 13n in the database 13, and/or data to be retrieved from one or more records in one or more database tables 13n in the database 13.

The version control subsystem 11 operates to facilitate versioning of the data in the database tables 13n. Generally, each of the records in a database table 13n is associated with a version. The version control subsystem 11 intercepts database queries from the users 14, and generates in response thereto one or more modified queries to facilitate versioning. The modified queries ensure, that, when a record is modified or added to the database table 13n, with the modified or added data being associated with a particular version, when data is thereafter retrieved from a record in response to a query related to a version, the data that is provided to the user who issued the query will be related to the appropriate version.

Before proceeding further, it would be helpful to describe the structure of a database table 13n and facilities provided therein used by the version control subsystem 11 to facilitate versioning, and the versioning schema provided by the version control subsystem 11 and how that schema is related to the facilities. The facilities provided in the database table 13n to facilitate versioning will be described in connection with FIG. 2, and the versioning schema provided by the version control subsystem 11 will be described in connection with FIG. 3. Thereafter, details operations performed by the version control subsystem 11 in connection with versioning will be described in connection with the flow charts depicted in FIGS. 4 and 6 through 9.

As shown in FIG. 2 database table 13n is in the form of an array comprising a plurality of rows 20(1) through 20(I) (generally identified by reference numeral 20(i)), each row having a plurality of fields 21(j) through 21(J) (generally identified by reference numeral 21(j)) and 22 through 26. Each row 20(i) is associated with a record in the database. Each record comprises a series of user data elements, which are stored in successive user data fields 21(j), . . . 21(J) across the row associated with the record. Each field 21(j) is associated with an attribute, which identifies a; type of data that is stored therein for the respective record. For example, in a database table 13n that stores employee information, various types of data may be stored in the database 13 for an employee, including such information as employee number, the employee's name, his or her residential address, his or her current salary and income tax filing status, and the like. In that case, each row 20(i) will be associated with an employee, and one field, for example, field 21(j), can be associated with the employee number attribute, and the respective row 20(i) will store in the field 21(j) the employee number of the employee who is associated with the respective row 20(i), with all of the rows 20(i) storing respective employee numbers in respective fields 21(i). Similarly, a second field, for example, field 21(2) can be associated with the employee name, and the respective row 20(i) will store in the field 21(2) the name of the employee who is associated with the respective row 20(i), with all of the rows 20(i) storing respective employee names in respective fields 21(2). Other types of employee data will be organized in the various fields of the respective rows in a similar manner.

The fields 22 through 26, which comprise version management fields, are provided for use in connection with versioning of the data stored in the database table 13n. Specifically, in each row 20(i), field 22 stores a value that corresponds to a version identifier for the record associated with the row and field 23 stores one or more values that identifies subsequent versions of the record that are associated with the row 20(i), if any. If there are no subsequent versions of the record associated with the row 20(i), a predetermined default value, which in one embodiment is selected to be "−1," is stored in the field 23. Each version is associated with a version identifier, which may be an alphanumeric value. When a user, who is working with a current version, wishes to establish a new version, the version control subsystem 11 assigns a version identifier to the version. The version identifier may, but need not, be the next value in an alphanumeric sequence. The version identifiers are generally used by the version control subsystem 12 in connection with creating new records in the database table 13n, updating records in the database table 13n and retrieving information from records in the database table 13n, and other activities to be described below.

Fields 24 through 26 include a synchronize field 24 and a deleted flag 26, which will be used as described below and a locked flag which, if set, indicates that the row 20(i) is locked, that is, that it is not to be modified.

When a user, operating with a particular version, issues a query to store a new record in the database table 13n, the version control subsystem 11 enables the DBMS 12 to create a new row 20(i) in the database table 13n and store the information received from the user in the new row. In addition, the version control subsystem 11 enables the DBMS 12 to provide version identifier and next version identifier information in the fields 22 and 23. The version identifier to be stored in the field 22 can comprise the version identifier for the version with which the user is operating or for which the user wishes the record to be created, and the next version identifier will comprise the default value.

When the user, using a particular version, issues a query to update a record that is associated with another version, the record being stored in a row $20(i_1)$ in the database table 13n, the version control subsystem 11 enables the DBMS 12 to create a new version of the record in which the, information will be updated. In that operation, the DBMS can copy information from the user data fields 21(j) of the row $20(i_1)$ into another row $20(i_2)$ thereby to facilitate creation of a new version of the record. For the field or fields that are associated with the attributes that are to be updated in the new version of the record, the version control subsystem 11 enables the DBMS 12 to store the updated data in those fields of the row $20(i_2)$. In addition, the version control subsystem 11 enables the DBMS 12 to store the version identifier associated with the particular version in version identifier field 22 and the default value in the next version identifier field 23 of the row $20(i_2)$ that is associated with the new record version. It will be appreciated that the rows $20(i_1)$ and $20(i_2)$ will be associated with the same record if they have the same key, which will be the case if the update operation does not change the contents of the field or fields that are associated with the record key, but the record version or versions with which the rows $20(i_1)$ and $20(i_2)$ are associated will be 11 determined by the version identifier and next version identifier information in fields 22 and 23 of the respective rows $20(i_1)$ and $20(i_2)$. In addition, the version control subsystem 11 will enable the DBMS 12 to add the version identifier of the particular version (that is, version identifier that was stored in the version identifier field 22 of row $20(i_2)$) to the next version field 23 of the row $20(i_1)$. It will be appreciated that the record version that is associated with row $20(i_1)$ can form the basis for multiple versions in this manner and, in that case, the next version field 23 will contain version identifiers for each of the versions for which it forms the basis.

Figure 3:
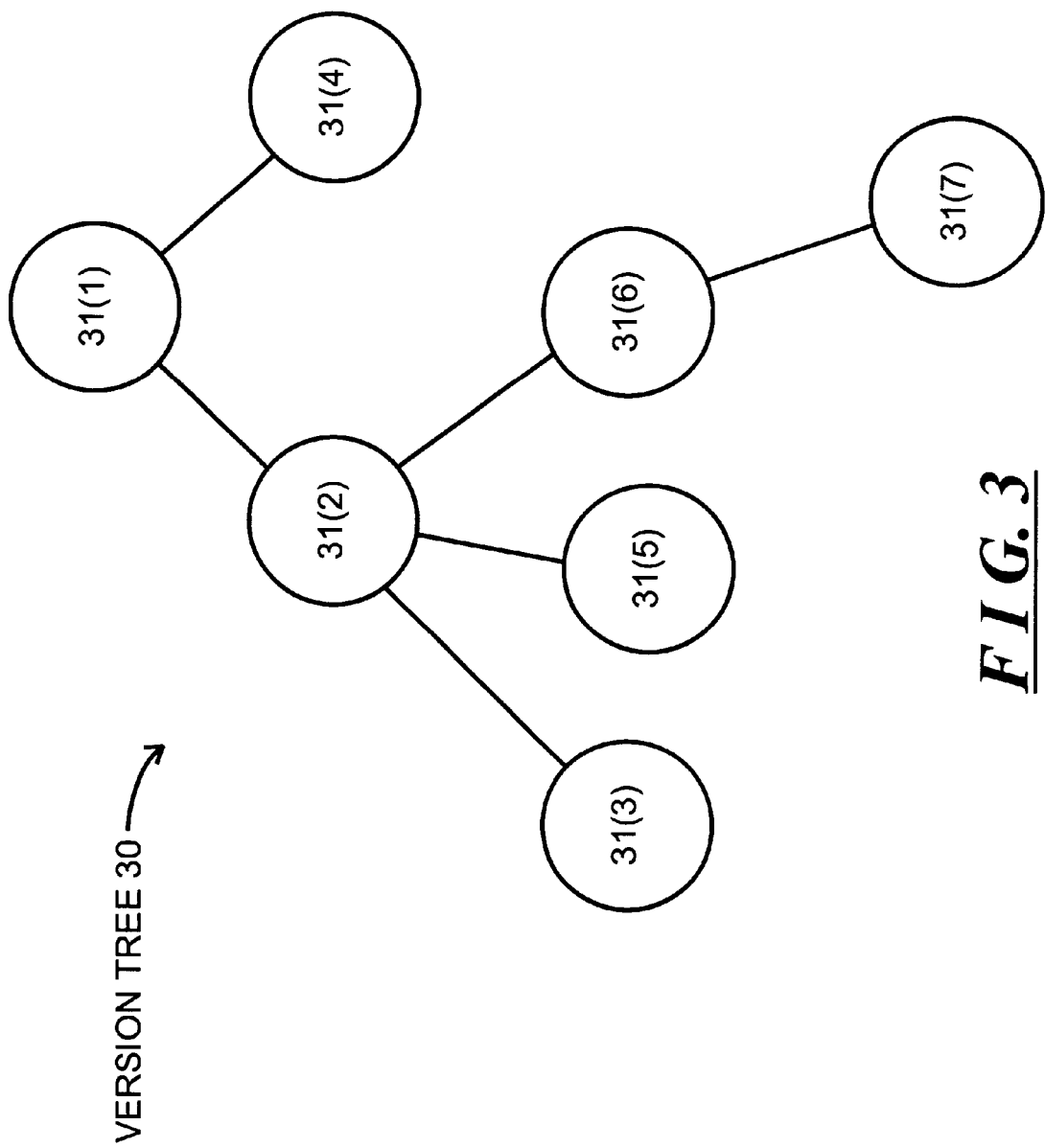
FIG. 3 depicts an illustrative version hierarchy maintained by the version control subsystem 11 in connection with a database table.

Essentially, the versioning of a database table 13n provided by the version control subsystem 11 conceptually forms a tree of versions such as the version tree 30 depicted in FIG. 3, with the relationships among versions being defined by the next version identifiers in fields 23 of the record, versions in the database table 13n. With reference to FIG. 3, the version tree 30 comprises a plurality of nodes, extending from a root node 31(1) to one or more leafnodes 31(n) (index "n" being an integer). In the version tree 30 depicted in FIG. 3, root node 31(1) has a plurality of child nodes 31(2) and 31(4), each of which represents a separate version of the version represented by the root node 31(1). The node 31(2), in turn, has three child nodes 31(3), 31(5) and 31(6), represents a version of the version represented by node 31(2), and node 31(6) has a child node 31(7) that represents a version represented by node 31(6), It will be appreciated that, since nodes 31(2), 31(4), 31(5) and 31(7) do not have any children, they constitute leaf nodes in the version tree 30. In the version tree 30, for each node 31(n) other than the root node 31(1), the next node closer to the root node 31(1) will be referred to as a parent node. Thus, for example, the node 31(6) is the parent of the node 31(7), node 31(2) is the parent of nodes 31(3), 31(5) and 31(6), and the root node is the parent of nodes 31(2) and 31(4). The version control subsystem 11 includes a version tree store, identified by reference numeral 15, to store a representation of the version tree 30 for each of the database tables 13n for which versioning is used.

As noted above, each of the nodes in the version tree 30 represents a version. The version represented by the root node 31(1) represents, for example, a base or root version, and the other versions, represented by nodes 31(2) through 31(7), represent child versions that include records in addition to or modified from the base version. When user wishes to establish a child version for a version, the version control subsystem 11 can also automatically create a new version for the parent version, with modifications to the parent version thereafter being made to the new version. Thus, for example, if a user enables a version represented by node 31(2) to be created as a child of the version represented by root node 31(1), the version control subsystem 11 may automatically enable another, version, illustratively, the version represented by node 31(4), to be created. In that case, if a user (who may be the same user or a different user) thereafter wishes to modify the version represented by the root node 31(1), modifications will instead be made to the version represented by node 31(4). As will be described below, this will provide that, when a new version is created from a parent version, the only modifications that are seen when working with a child version will be those modifications that are made to the child version. Thus, for example, and with reference also to FIG. 2, if a user, working with the root version 31(1), wishes to update a row $20(i_x)$ in the root version after the child version 31(2) has been created, the version control module 11 will enable the DBMS 12 to copy the contents of row $20(i_x)$ into a row $20(i_y)$, which, in turn, will be associated with the child version represented by child node 31(4). In addition, as described above, the version control module 11 will enable the DBMS 12 to append the version identifier associated with the child version represented by child node 31(4) to the contents of next version field 23 of row $20(i_x)$ and the version identifier field 22 of the new row $20(i_y)$ associated with the child version represented by child node 31(4). As further described above, the version control module 11 will enable the DBMS to provide the default value in the next version field 23 of the new row $20(i_y)$ associated with the child version represented-by child node 31(4). Similar operations will be performed when a user wishes to modify a record associated with any version after a child version has been established therefor. As further noted above, in each row 20(i), the version identifier field 22 identifies the version identifier of the version with which the row 20(i) is associated, and the next version identifier field 23 identifies the child versions that depend directly therefrom in the version tree 30. Essentially, for a version associated with a node 31(n) in the version tree, each row 20(i) that has been modified for a version further down the tree, the field 23 of the row 20(i) will contain a list identifying the version(s) further down the tree for which the contents of the row have been modified. For example, if, for each version, the version identifier corresponds to the index "n" in the reference numeral 31(n) identifying the node associated with the respective version, and if a record in row $20(i_1)$ is modified in the versions associated with nodes 31(2) and 31(7), but not the version associated with node 31(6), then two additional rows will be provided for the record, namely, a row $20(i_2)$ for the record for the version associated with node 31(2) and a row $20(i_7)$ for the record for the associated with node 31(7). In that case, the version identifier and next version identifier fields 22 and 23, respectively, will contain the following values:

| Row | Version Identifier Field 22 | Next Version Identifier Field 23 |
| --- | --- | --- |
| $20(i_7)$ | 7 | −1 (the default value) |
| $20(i_2)$ | 2 | 7 |
| $20(i_1)$ | 1 | 2. |

Note that the version identifier "6" will not appear in the next version identifier field of rows $20(i_2)$ or $20(i_1)$ because the record associated with the row was not modified for the version associated with node 31(6). In addition, the version identifier "7" will not appear in the next version identifier field of row $20(i_1)$ associated node 31(1) with because the record was modified in the version associated with node 31(2) and the version identifier for the version associated with node 31(7) is provided in the next version identifier field 23 of the record version associated with node 31(2).

On the otherhand, if the record associated with the row $20(i_1)$ is also modified for the version associated with nodes 31(3) and 31(4), rows $20(i_3)$ and $21(i_4)$ will also be provided for the associated with those versions and the version identifier and next version identifier fields 22 and 23, respectively, will contain the following values:

| Row | Version Identifier Field 22 | Next Version Identifier Field 23 |
| --- | --- | --- |
| $20(i_7)$ | 7 | −1 (the default value) |
| $20(i_2)$ | 2 | 3,7 |
| $20(i_4)$ | 4 | −1 (the default value) |
| $20(i_3)$ | 3 | −1 (the default value) |
| $20(i_1)$ | 1 | 2,4. |

To facilitate retrieval of information relating to a particular version, the version control subsystem 11 also enables the DBMS 12 to use the version and next version information in fields 22 and 23 to facilitate the retrieval of information from records related to the appropriate version. Thus, if a user, using, for example, the version associated with node 31(6), wishes to retrieve a record, and if (i) the record has a version associated with node 31(1) but not been updated in either the version associated with node 31(2) or the version associated with node 31(6), and (ii) the record otherwise satisfies the other criteria in the query issued by the user, the information to be provided will be from the version of the record associated with node 31(1). In that case, it will be appreciated that the row 20(i) associated with that record version will have the version identifier "1" in the version identifier field 22.

On the other hand, if the record has been modified in the version associated with node 31(2), but not in the version associated with node 31(6), the record version from which information is to be provided will be from the record version associated with the node 31(2), and in that case the row 20(i) from which information is to be obtained will have the value "2" in the version identifier field 22.

Finally, if the record has been modified in the version associated with node 31(6), the record version from which information is to be provided will be the record version associated with the node 31(6), and in that case the row 20(i) from which information is to be obtained will have the value "6" in the version identifier field 22.

The filtering described above to, identify the appropriate record version from which information will be provided in response to a query from a user will be performed for every record that otherwise satisfies the query. The filtering may be performed by the version control subsystem. 11. In that case, the version control subsystem 11 will provide the query as received from the user to the DBMS 12, augmented in a manner so as to enable the DBMS 12 to retrieve information not only from appropriate user data fields 21 (j) of the row or rows that are required to satisfy the query as received from the user, but also the version information in fields 22 that the version control subsystem 11 will use to perform the filtering. The DBMS 12 will provide to the version control, subsystem 11 the information associated with all of the record versions of each record that satisfies. the query as received from the user. After the version control subsystem 11 receives the information, it will, for each record, filter the record versions as described above.

Alternatively, since the version control subsystem 11 maintains version tree information identifying the sequence of versions between the root version (the version associated with, for example, node 31(1) in FIG. 3) and the version for which information is to be retrieved, the version control subsystem 11 can augment the query as received from the user with retrieval criteria specifying the specific versions identifier for versions from the root version to the version for which information is to be retrieved, and further augmented in a manner so as to enable the DBMS 12 to retrieve information not only from ones of the user data fields 21(j) of the rows 20(i) that are required to satisfy the query as received from the user, but also the version information in fields 22. In that case, the DBMS 12 will return information for record versions along the series of versions from the root version to the version for which information is to be retrieved. After the version control subsystem 11 receives the information, it will, for each record, filter the record versions as described above.

Alternatively, the version control subsystem 11 can augment the query as received from the user to enable the DBMS 12 to retrieve, for each record from which information is to be obtained, information only from the appropriate record version or versions. In that case, for example, in: response to a query from a user operating with version 7 (FIG. 3) for retrieval of user data from a record, the version control subsystem 11 can generate a query that (i) if a version of the record associated with the version associated with node 30(7) exists, enables retrieval from that record version, but (ii) if no version of the record associated with the version associated with node 30(7) exists, but a version of the record associated with the version associated with node 30(6) exists, enables retrieval from that record version, but (iii) if no version of the record associated with the version associated with node 30(6) exists, but a version of the record associated with the version associated with node 30(2 exists, enables retrieval from that record version, and finally (iv) if no version of the record associated with the version associated with node 30(2) exists, but a version of the record associated with the version associated with root node 30(1) exists, enables retrieval from that record version.

It will be appreciated that, if a version of the record exists for versions along the path from the version associated with root node 30(1) to the version associated with the node 30(7), such an augmented query will enable the last record version along the path to be retrieved. Forms of augmented queries for other types of operations will be apparent to those skilled in the art. Since the version control subsystem 11 maintains information describing the version hierarchy, it would be relatively straightforward for it to generate such an augmented query.

As described above in connection with FIG. 2, when a user provides a query to update a record associated with a version, with the updated record to be associated with another version, copy of the row 20($i_1$) associated with the previous version is made in the table. to provide a row 20($i_2$) for the new version of the record. To accomplish that, the version control subsystem 11 can, for example, initially generate a query to enable the DBMS 12 to retrieve the contents of at least those user data fields 31(j) of the row 20($i_1$) that are not to be updated. After the version control subsystem 11 receives the contents of the row 20($i_1$), it generates a query to enable the DBMS 12 to create a new row 20($i_2$) for the new version of the record, including the data from the field or fields of the row 20($i_1$) whose contents are not to be updated, the new information for the field or fields whose contents are to be updated, and the version identifier and next version identifier for the fields 22 and 23 of the row 20($i_2$). It will be appreciated that the next version identifier will be the default value. In addition, the version control subsystem 11 can generate queries to enable the DBMS 12 to update the next version identifier information in field 23 of row 20($i_1$) associated with the previous version.

On the other hand, when the user, using a particular version, issues a query to delete a record, the version control subsystem 11 enables the DBMS 12 to determine whether the row 20(i) containing the record version associated with the version is also associated with other versions higher in the version hierarchy. In that operation, the DBMS 12 can determine whether the row 20(i) contains, in the version identifier field 22, the version identifier for the particular version. If so, the DBMS 12 will set the deleted flag 26 for the row 20(i), thereby to indicate that the record has been deleted. On the other hand, if the DBMS 12 determines that the row 20(i) does not contain, in the version identifier field 22, the version identifier for the particular version, which may be the case if the record has not been created or updated in that version, it will create a new record version for the version for which the record is to be deleted, in the manner described above, and sets the delete flag 26 in that record version. It will be appreciated that, when a record is to be deleted for a particular version, the record version that is deleted will contain the version identifier for the particular version in the version identifier field 22. By deleting a records in this way, the version control subsystem 11 ensures that records are not deleted for versions other than the version for which it is to be deleted, but instead will be available in other versions higher in the version hierarchy if a user issues a query to retrieve information therefrom or update information therein for those other versions.

Figure 4A:
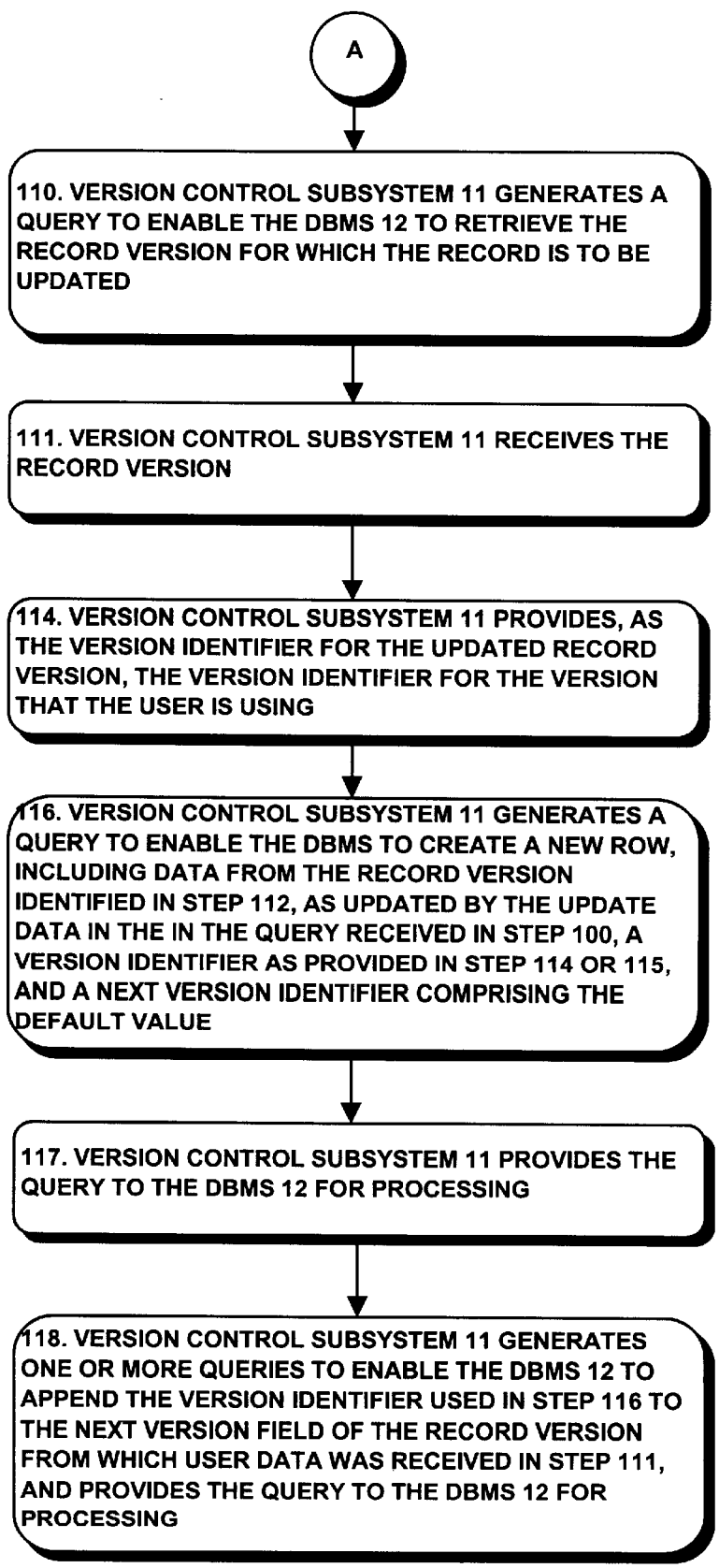
FIG. 4 depicts a flowchart that is useful in understanding the operation of the version control subsystem 11 in connection with versioning of a database table.
Figure 4B:
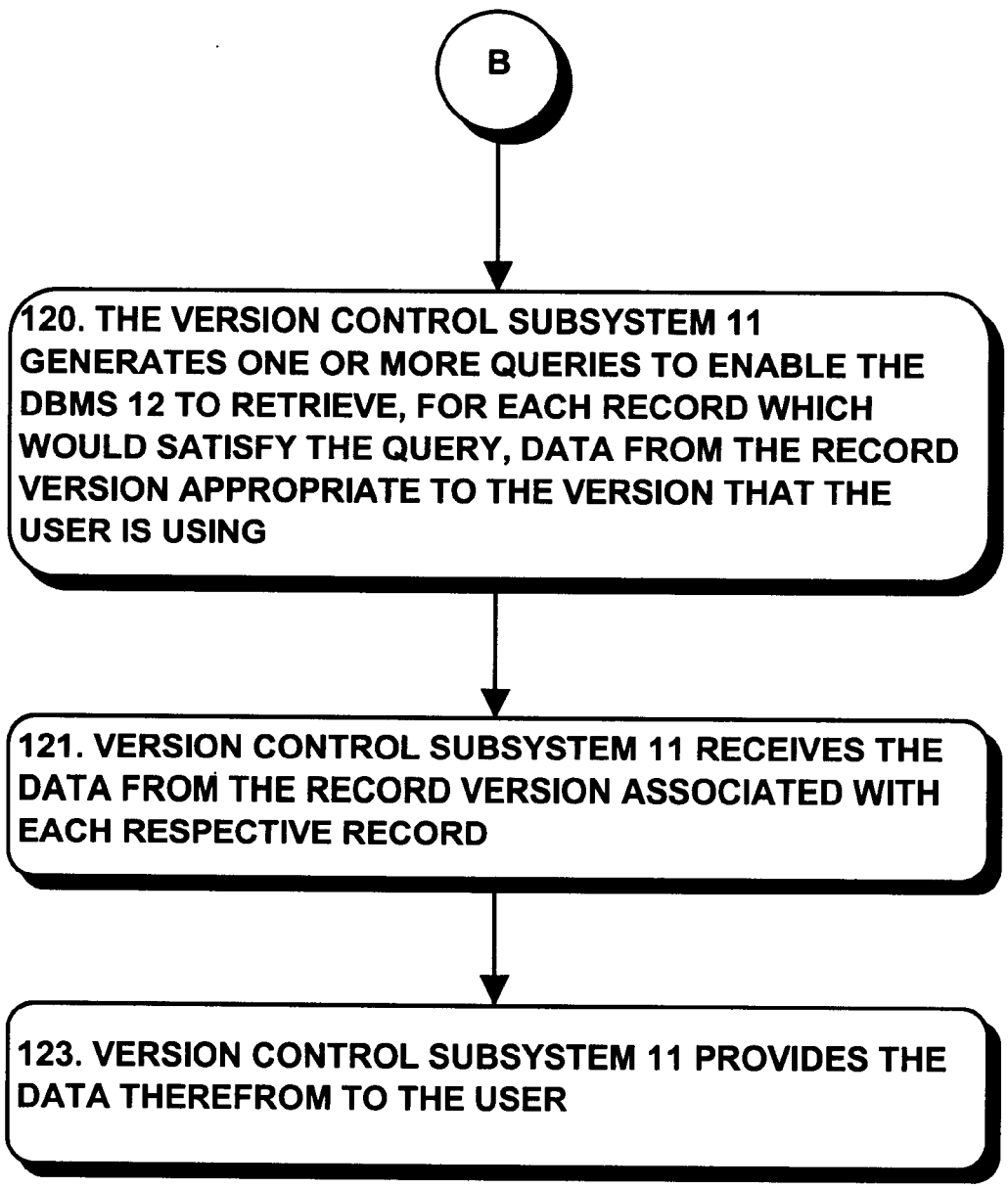
Figure 4C:
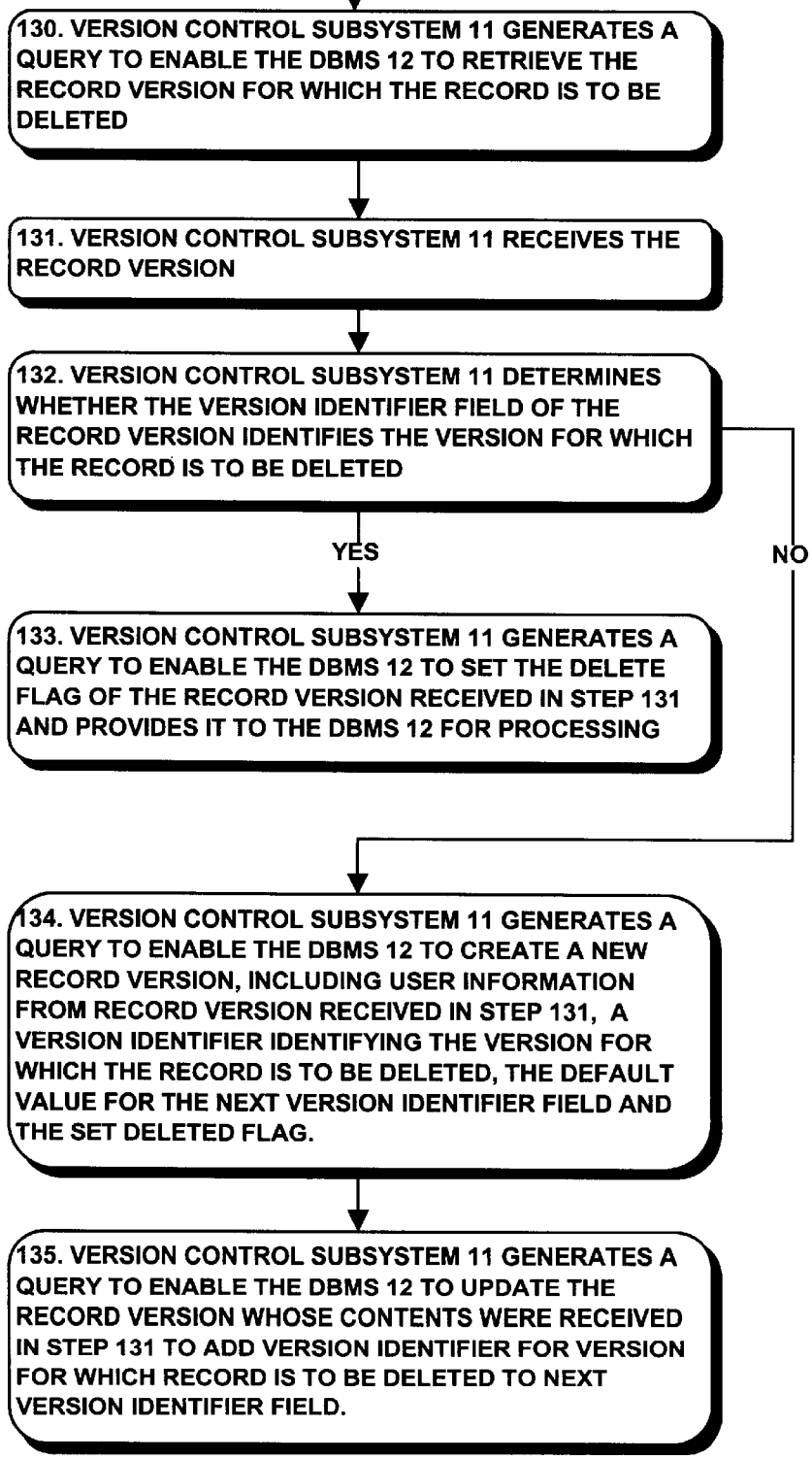

With this background, operations performed by the version control subsystem 11 will be described in connection with the flow chart depicted in FIG. 4. In the following, it will be assumed that the version control subsystem 11 augments a query related to a version to facilitate retrieval of only the appropriate record version (the third alternative described above). With reference to FIG. 4, the version control subsystem 11 initially receives a query from a user (step 100) and thereafter determines whether the query is to enable a new record to be created, to enable a record to be updated, to enable data from one or more records to be retrieved or to enable a record to be deleted (step 101). If the version control subsystem 11 determines in step 101 that the query is to enable a new record to be created, the version control subsystem 11 generates an augmented query including information from the query received in step 100, a version identifier identifying the version with which the user is operating, and a next version identifier comprising the default value (step 102) and provides the augmented query to the DBMS 12 for processing (step 103). It will be appreciated that, in response to the augmented query, the DBMS 12 will enable a new row 20(i) to be created in the appropriate database table 13n, and store the information provided in the query, including the version identifier and next version identifier, in the appropriate fields of the new row, thereby to create a record version for the record.

Returning to step 101, if the version control subsystem 11 determines in that step that the query is to enable a record to be updated, the version control subsystem 11 initially performs several, steps to identify the particular row 20(i) that contains the record version for the version that the user is operating. In those operations, the version control subsystem 11 generates an augmented query to enable the DBMS 12 to retrieve the record version for which the record is to be updated (step 110). Generally, the augmented query will identify the record, preferably by key or other identifying information, and will also contain version identifier information to enable the DBMS 12 to select the appropriate record version. For example, if the version for which a record is to be updated is the version associated with node 31(7), the version control subsystem 11 may, for example, generate an augmented query to enable the DBMS 12 to retrieve information from the first of the record version for the series of versions associated with nodes 31(7), 31(6), 31(2) and 31(1), as indicated in version identifier field 22, that exists, and further provided the deleted flag is not set indicating that the record version has been deleted. After the version control subsystem 11 receives the record version or versions (step 111) it determines as the version identifier for the updated record version, the version identifier for the version that the user is using (step 114), generates an augmented query to enable the query including data from the record version identified in step 112, as updated by the update data in the query received in step 100, and further including a version identifier as determined in step 114, and a next version identifier comprising the default value (step 116) and provides the augmented query to the DBMS 12 for processing (step 117). It will be appreciated that, in response to the augmented query, the DBMS 12 will enable a new row 20(i) to be created in the appropriate database table 13n, and store the data provided in the query, including the version identifier and next version identifier, in the appropriate fields of the new row. Following step 117, the version control subsystem 11 generates one or more queries to enable the DBMS 12 to append the version identifier used in step 116 to the next version field 23 of the record version from which user data was received in step 111, and provides it to the DBMS 12 for processing (step 118).

Returning to step 101, if the version control subsystem 11 determines in that step that the query is to enable data from one or more records to be retrieved, the version control subsystem 11 performs operations similar to those described above to identify the particular row(s) 20(i) that contains the record version of each record for the version that the user is using. In those operations, the version control subsystem 11 generates one or more queries to enable the DBMS 12 to retrieve, for each record that would satisfy the query, data from the record version appropriate to the version for which the user wishes data to be retrieved (step 120), as described above in connection with step 110. After the version control subsystem 11 receives the data from the record version or versions associated with each respective record (step 121), it provides the data therefrom to the user (step 123).

Returning to step 101, if the version control subsystem 11 determines in that step that the query is to enable a record to be deleted, it will initially determine, for the version for which the record is to be deleted, whether the record version is also associated with another version higher in the version hierarchy along the series of versions from the version for which the record is to be deleted to the version associated with the root node in the version hierarchy. Accordingly, if the version control subsystem 11 determines in step 101 that the query is to enable a record to be deleted, it will sequence to step 130 to generate a query to enable the DBMS 12 to retrieve at least the version identifier from field 22 of the record version for which the record is to be deleted, in a manner similar to that described above in connection with step 110. After the version control subsystem 11 has received the version identifier (step 131) it determines whether the version identifier corresponds to the version identifier for the version for which the record is to be deleted (step 132). If the version control subsystem 11 makes a positive determination in step 132, it generates a query to enable the DBMS 12 to set the delete flag 26 of the record version from which the version identifier was received in step 131, and provides the query to the DBMS 12 for processing (step 133).

On the other hand, if the version control subsystem 11 makes a negative determination in step 132, it will sequence to step 134, in which it generates one or more queries to enable the DBMS 12 to create a new record version using the information from the record version from which the version identifier was received in step 131(step 134). The query or queries will enable the new record version to include the user data from fields 21(j) of the record version from which the version identifier was received in step 131, a version identifier for field 22 corresponding to the version for which the record is to be deleted, a next version identifier for field 23 corresponding to the default value and a set deleted flag 26. Thereafter, the version control subsystem 11 will generate one or more queries to enable the DBMS 12 to update the record version from which the version identifier was received in step 131 to load the version identifier of the version for which the record is to be deleted in the next version identifier field 23 thereof.

The version control subsystem 11 provides a number of advantages. In particular, the version control subsystem 11 facilitates versioning of a database table 13n in a manner that does not require modification of a DBMS 12. Versioning is essentially provided on a record-by-record basis, which can reduce the amount of storage space that might be required if versions were on a table-by-table basis. Such record-level versioning is facilitated by version control subsystem 11 merely by adding additional attributes to the database table 13n, which, in turn, facilitate access by a conventional DBMS using queries generally as provided by a user 14, but augmented as necessary to identify appropriate record versions. Unlike a check-out/check-in scheme, the version control subsystem 11 facilitates creation of a hierarchy of versions, which is generally not possible with other schemes, such as check-out/check in. In addition, since records are duplicated for respective versions on a record-by-record basis, and then only when an update is made to the record for the respective version, storage requirements are reduced. And, since all versions of all records in a database table 13n are maintained in the database table, a number of users can readily access the various versions concurrently, with the DBMS 12 ensuring that updates to even the same record versions associated with a respective version are performed in the correct order, thereby enhancing the possibility of collaboration among users who may be using the same version.

Versioning as described above is on a table-by-table basis, that is, the version hierarchy of a database table 13n, such as that depicted in FIG. 3, will only include versions of a single database table 13n. Each database table 13n may have its own associated version hierarchy, which may, but need not, be similar to version hierarchies of another database table 13n' (n'≠n) in the database 13. The version control subsystem 11 can also allow users to enable states of the database 13 to be established in a state hierarchy. In a state hierarchy, each state can have versions associated with several tables 13n. As with versions, states of the database 13 are organized in the form of a tree, such as that described above in connection with FIG. 3. When a user enables the version control subsystem 11 to associate a table 13n, that is currently associated with one (parent) state, with a child of that state, the version control subsystem 11 creates not only one child version to be associated with the child state, but also an additional version that is to be associated with the parent state. The additional version is also treated as a child version of the parent version. In that case, the version control subsystem 11 normally provides that, in each state, accesses (that is, for example, creation of new records, updates to existing records, deletion of records and retrievals from records) to a database table 13n in a state will be made to the last version that was created in the state. This will provide that changes that a user may wish to make to the version in the parent state subsequent to creation of the version in the child state will not be visible to the version in the child state, since they will instead be made in the child version that was created in the parent state.

A user can also enable a child version of a database table 13n to be created in the same state as the parent version, in which case the parent version can operate as, for example, a checkpoint of the table, that is, a version representing the state of the table 13n at the point in time at which the child version was created. In that case, the version control subsystem 11 need not establish an additional child version in any state. The user can enable a series of such versions to be associated with a state. Checkpointing in this manner can provide several advantages. For example, checkpointing will allow a user to roll back changes made to the table 13n since the child version was established merely by referring to the parent version, instead of the child version, as the last version in the state. In addition, a user may enable the version control subsystem 11 to create a child version from any version in the series of checkpoints and associate that child version with a child state. It will be appreciated that, in that case, if the version that is to be the parent of the version in the other state is not the last version in the parent state, no additional child version will be necessary in the parent state since updates to and retrievals from the parent state will continue to be made to and obtained from the last version of the database table 13n in the parent state.

Having the version control subsystem 11 normally limit access to a database table 13n in a state to the last version in the state provides a number of advantages; For example, if a number of users wish to collaborate, they will likely need to have concurrent access to the same set of database tables. In that case, if one user creates a new version of a database table 13n in a state, it is desirable to have all of the collaborating users access the same version of that database table 13n. If the version control subsystem 111 did not normally limit access to the last version in the state, the user who created a new version would need to notify all of the other users that the new version had been created in the state, which can be burdensome and time consuming. In addition, the other users would need to take care to access the new version, which can lead to errors if users forget which version they are supposed to access. By normally limiting access in this manner, the version control subsystem 11 will automatically ensure that accesses to a database table 13n by all users who are collaborating are made to the same version in the state. In one embodiment, the version control subsystem 11 allows tables to be "version-enabled," that is, it allows users to enable various versions of a database table 13n to be created, on a table-by-table basis. Thus, if a table 13n of database 13 is not version-enabled, it will exist only in the root state.

Figure 5:
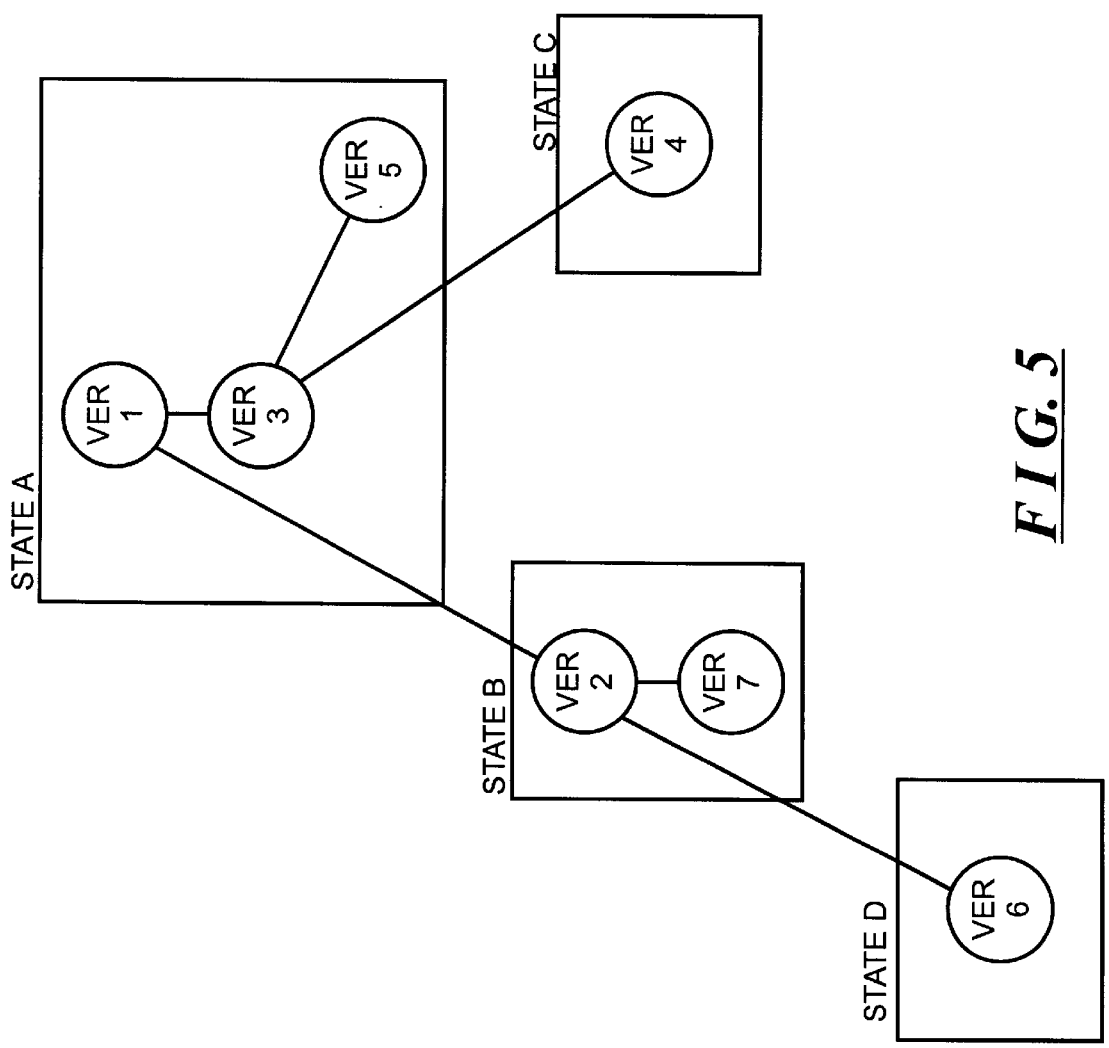
FIG. 5 depicts an illustrative state hierarchy maintained by the version control subsystem 11 in connection with a database 13, and an illustrative version hierarchy of a database table associated therewith.

A specific example of the association between states of a database 13 and versions of a database table 13n will be described in connection with FIG. 5. With reference to FIG. 5, a state hierarchy 40 is depicted comprising four states, namely, states A, B, C, and D. State A is the root state, and has two children, namely states B and C; thus, root state A is the parent of states B and C. State B has state D as a child state; thus, state B is parent to state D. In this example, database table 13n, which, as with all tables in the database 13, is initially associated with the root state A, is to be associated with states B, C and D, in that order. The version of the database table 13n in the root state A will be identified as version 1. When a user associates the database table 13n with state B, the version control subsystem 11 will create a new version, which will be identified as version 2, in state B, and will also create a new version, which will be identified as version 3, in the root state A. When a user thereafter associates the database table with state C, the version control subsystem 11 will also create a new version, which will be identified as version 4, in the state C, and yet another version, which will be identified as version 5, in the root state A. Similarly, when a user associates the database table with state D, the version control subsystem 11 will create a new version, which will be identified as version 6, in the state D, and will also create a new version 7 in the parent state B. It will be appreciated that the specific values chosen as the version identifiers are arbitrary, as the values in the version identifier and next version identifier fields 22 and 23 that are used in the various rows 20(i) associated with the respective versions actually define the version hierarchy. FIG. 5 depicts the association between states A through D and versions 1 through 7. It should be noted that version 4 associated with state C is a child of version 3 associated with the root state A, since, that version is the latest version in the root state A when the database table 13*n* is associated with state C.

As noted above, each database table 13*n* can have a version hierarchy associated with various ones of the states. The version control subsystem 11 also includes a state information store 16 (FIG. 1) for storing, for each state, the identifier or identifiers of the versions of each database table 13*n* that are associated with the state.

The purpose of the new versions created in the respective states will be clear from the following. As noted above, updates that are made to a database table 13*n* in one state are made to the last version in the state; that is, the only version in a state that is "visible" to a user is the last version of the respective table 13*n* in the state. Thus, for example, in the example described above in connection with FIG. 5, updates to the database table 13*n* in root state A will be made to version 5, and updates to the database table 13*n* in state B will be made to version 7. This will ensure that, except as described below, updates which are made to the database table 13*n* in root state A will not be visible in either state B, C or D, and, similarly, updates which are made to the database table 13*n* in state B are not visible in state D. This will be clear from the following scenarios:

(i) The entire state hierarchy depicted in FIG. 5 has been established. A user, operating in state A, wishes to update a row 20(*i*) for which a record version exists only in version 1 (that is, the row 20(*i*) identifies version 1 in its version identifier field 22). In that case, as described above, the, version control subsystem 11 will create a new row 20(*i'*) in the database table 13*n* for version 5, that is, it will load the value "5" in both the version identifier field of row 20(*i'*) and the next version identifier field 23 of row 20(*i*). It will be appreciated that both rows 20(*i*) and 20(*i'*) are associated with the same database record. Thus, if a user operating in state A later wishes to retrieve user data from the record, the version control subsystem 11 constrains the user to use the last version of the database table 13*n* in the state, and so the user data for the record will be retrieved from row 20(*i'*). On the other hand, if a user, operating in any of the other states, later wishes to retrieve data from the record, the user data for the record will be retrieved from row 20(*i*), that is, the user data as it existed when the child states B and C were established.

(ii) The entire state hierarchy depicted in FIG. 5 has been established. A user, operating in state B, wishes to update a row 20(*i*) for which a record version exists only in version 1 (that is, the row 20(*i*) identifies version 1 in its version identifier field 22). In that case, as described above, the version control subsystem 11 will create a new row 20(*i'*) in the database table 13*n* for version 7, that is, it will load the value "7" in both the version identifier field of row 20(*i'*) and the next version identifier field 23 of row 20(*i*). It will be appreciated that both rows 20(*i*) and 20(*i'*) are associated with the same database record. In that case, if a user operating in root state A, state C or state D later wishes to retrieve user data from the record, the user data for the record will be retrieved from row 20(*i*). On the other hand, if a user operating in state B later wishes to retrieve user data from the record, since the version control subsystem 11 constrains the user to use the last version of the database table 13*n* in the state, the user data for the record will be retrieved from row 20(*i'*).

(iii) The entire state hierarchy depicted in FIG. 5 has been established. A user, operating in state D, wishes to update a row 20(*i*) for which a record version exists only in version 1 (that is, the row 20(*i*) identifies version 1 in its version identifier field 22). In that case, as described above, the version control subsystem 11 will create a new row 20(*i'*) in the database table 13*n* for version 6, the last version of the state D, and in that operation it will load the value "6" in both the version identifier field of row 20(*i'*) and the next version identifier field 23 of row 20(*i*). It will be appreciated that both rows 20(*i*) and 20(*i'*) are associated with the same database record. Thus, if a user operating in state A, B, or C later wishes to retrieve user data from the record, the user data for the record will be retrieved from row 20(*i*). On the other hand, if a user, operating in state D, later wishes to retrieve data from the record, since the version control subsystem 11 constrains the user to use the last version of the database table 13*n* in the state, the user data for the record will be: retrieved from row 20(*i'*).

(iv) With reference to FIG. 5, suppose state B has been created and a user, operating in state A, wishes to update a record for which a record version exists only in version 1 (that is, the row 20(*i*) associated with the record version identifies version 1 in its version identifier field 22). In that case, as described above, the version control subsystem 11 will create a new row 20(*i'*) in the database table 13*n* for version 3, that is, it will load the value "3" in both the version identifier field of row 20(*i'*) and the next version identifier field 23 of row 20(*i*). Suppose further that thereafter state C is created, and the user, also operating in state A, wishes to update the record associated with row 20(*i'*). In that case, since the user will be operating with version 5, the version control subsystem 11 will create yet another row 20(*i"*) in the database table for version 5. Thus, if a user operating in state B or D later wishes to retrieve user data from the record, and the record has not been updated in respective version B or D, the user data will be retrieved from row 20(*i*), that is, the version of the record as it existed when the database table 13*n* was associated with state B. On the other hand, if a user operating in state C later wishes to retrieve user data from the record, the user data will be retrieved from row 20(*i'*), the version of the record that was created in state A after the database table 13*n* was associated with state B but before the database table 13*n* was associated with state C. Finally, if a user operating in state A late wishes to retrieve user data from the record, the user data will be retrieved from row 20(*i"*), the last version of the record associated with state A.

Figure 8:
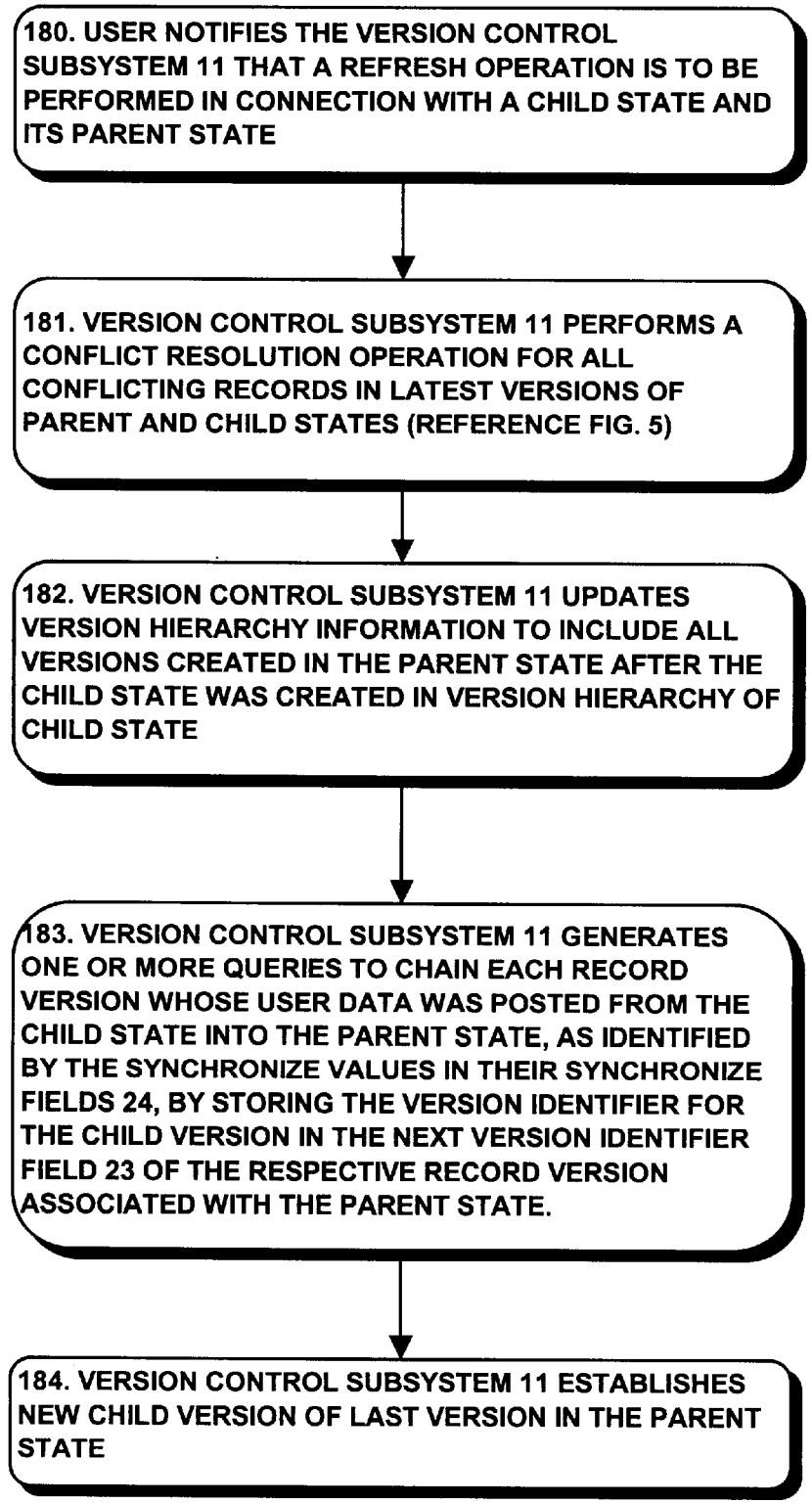

As noted above, when a user operates in connection with a state, the version control subsystem 11 normally ensures that he or she will operate in connection with the last version of the database table 13*n* that has been associated with the state. This will ensure that, except as described below in connection with particularly FIG. 8, changes made to a database table 13*n* in one state will not be visible in that state's children. This allows a user to enable a database table 13*n* to be associated with a child state, such as state B, without having to make the effort notify other users who may be using the database 13 that updates to the database table 13*n* in the parent state A should be made in the new version of the database table 13*n* that is created in the parent state A to ensure that the updates are not visible in the child state B. FIG. 8 depicts a refresh operation, in which a user can enable changes which have been made to a database table 13*n* in the parent state following association of the table 13*n* with the child state, or following a previous refresh operation (if any), are made visible in the child state. That is, as described above, normally changes that have been made to a database table in the parent state following association of the table 13*n* with the child state will not be visible in the child state; however, following a refresh operation, changes that a user has made to the database table 13n after it has been associated with the child state, or following a previous refresh operation, will be visible in the child state.

Figure 6:
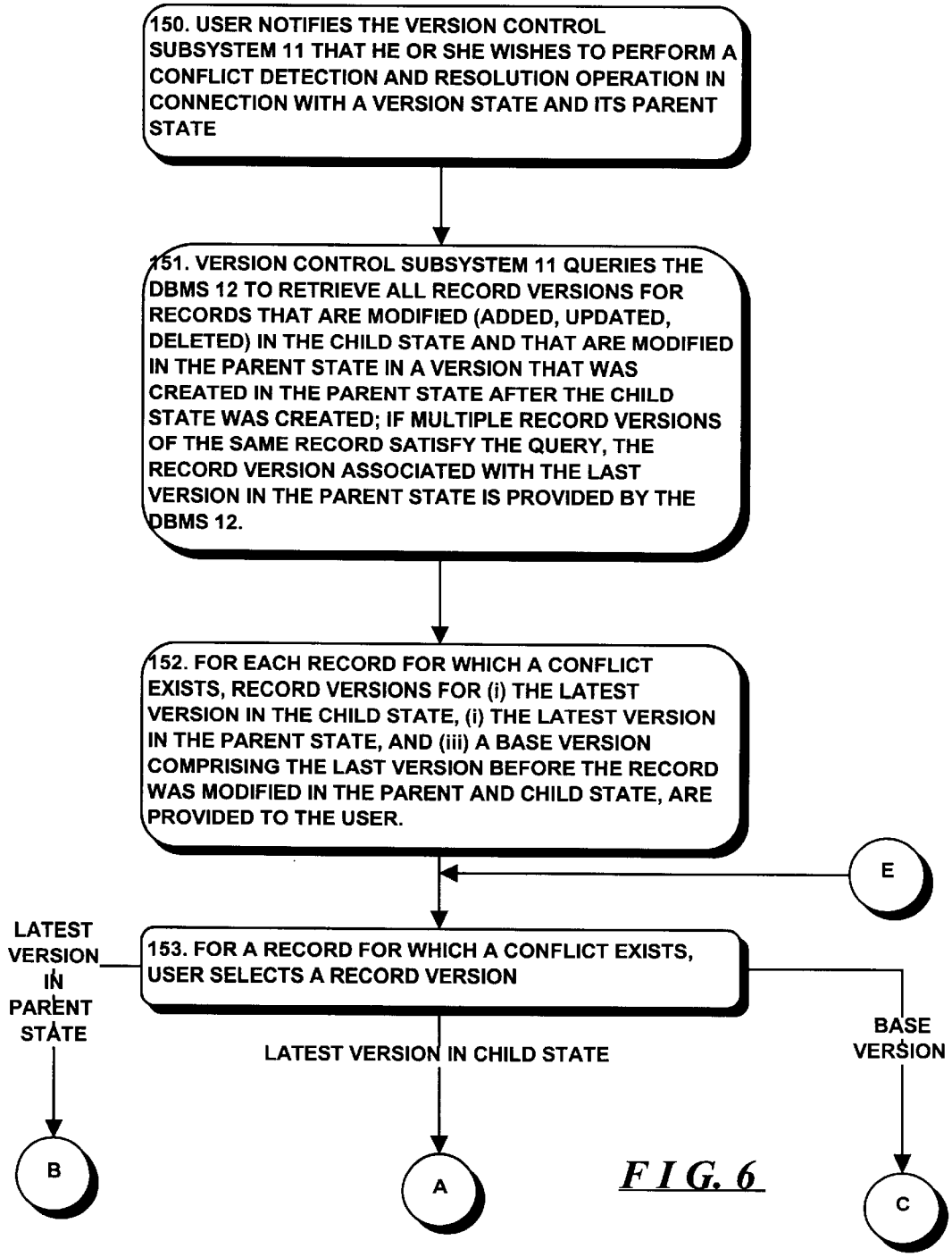
FIGS. 6 through 9 depict flowcharts useful in understanding the operation of the version control subsystem 11 depicted in FIG. 1 in connection with a state hierarchy.
Figure 6A:
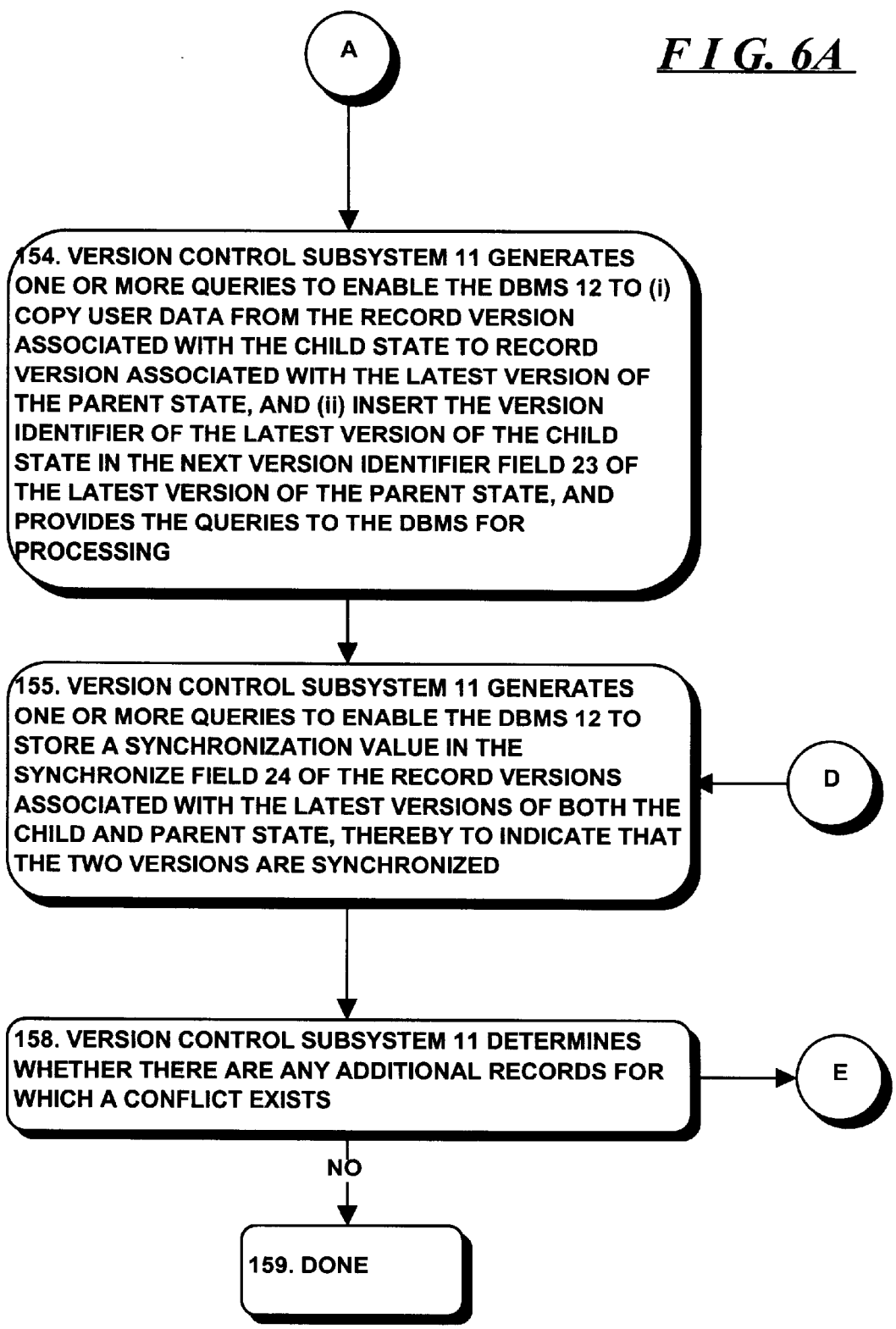
Figure 6B:
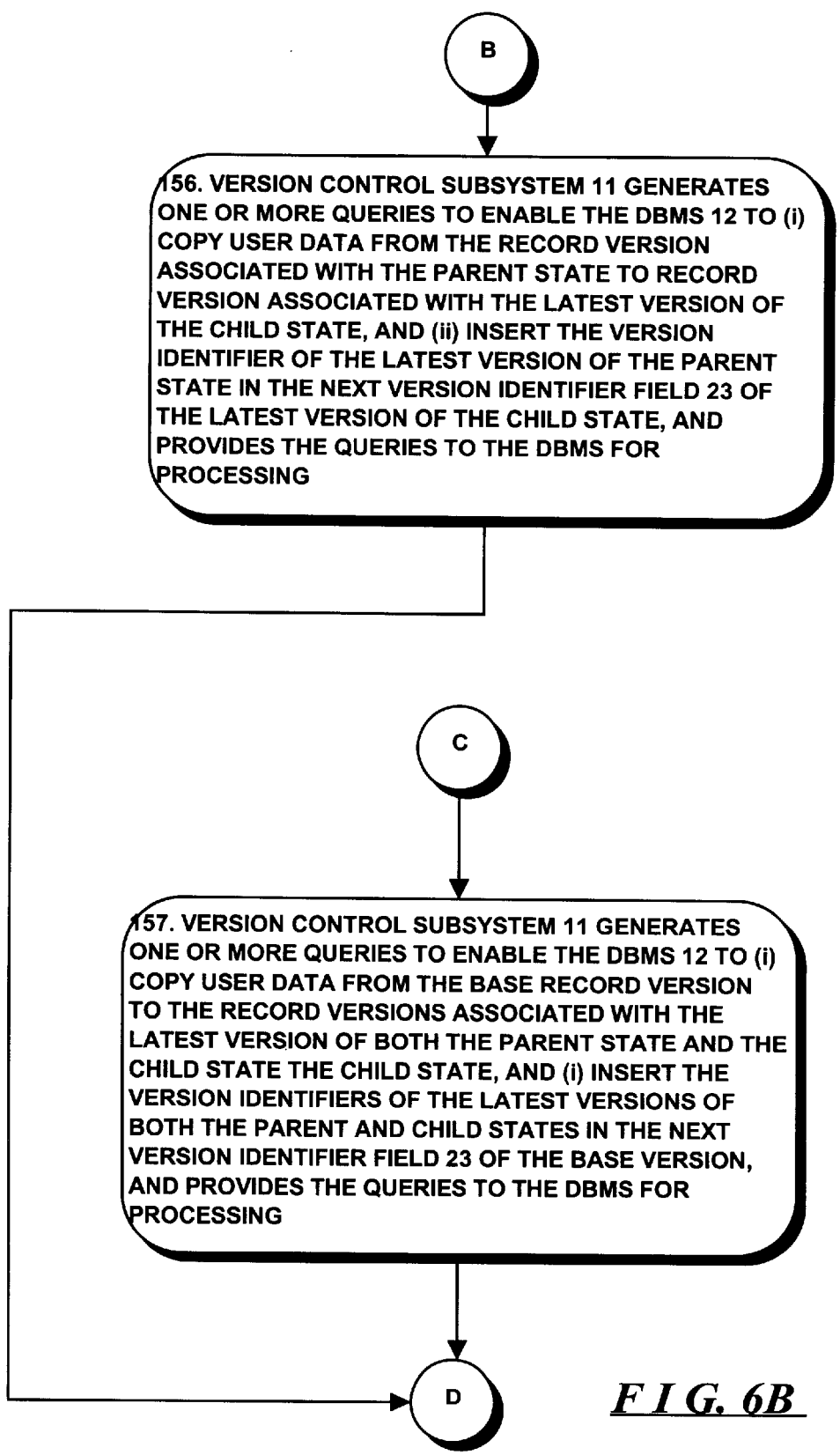
Figure 7:
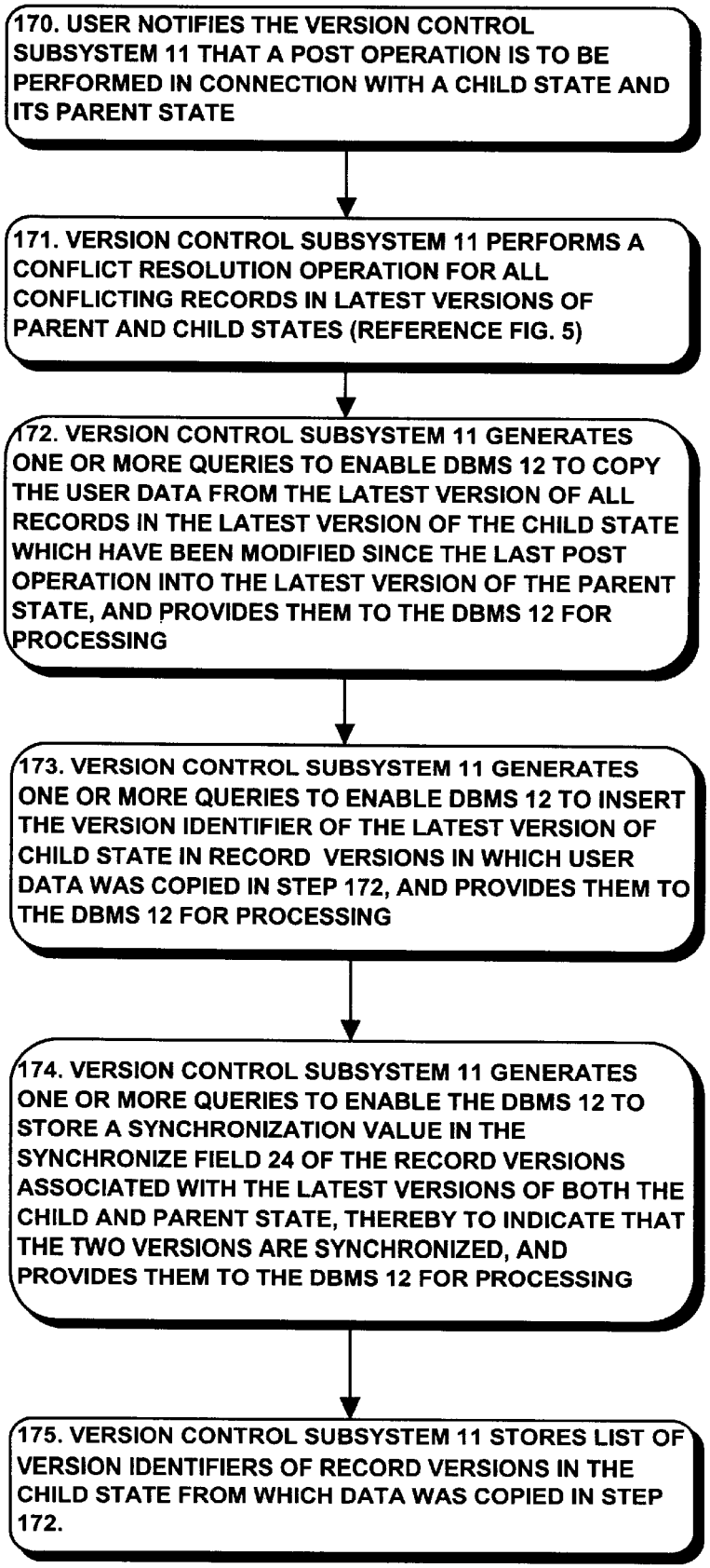
Figure 9:
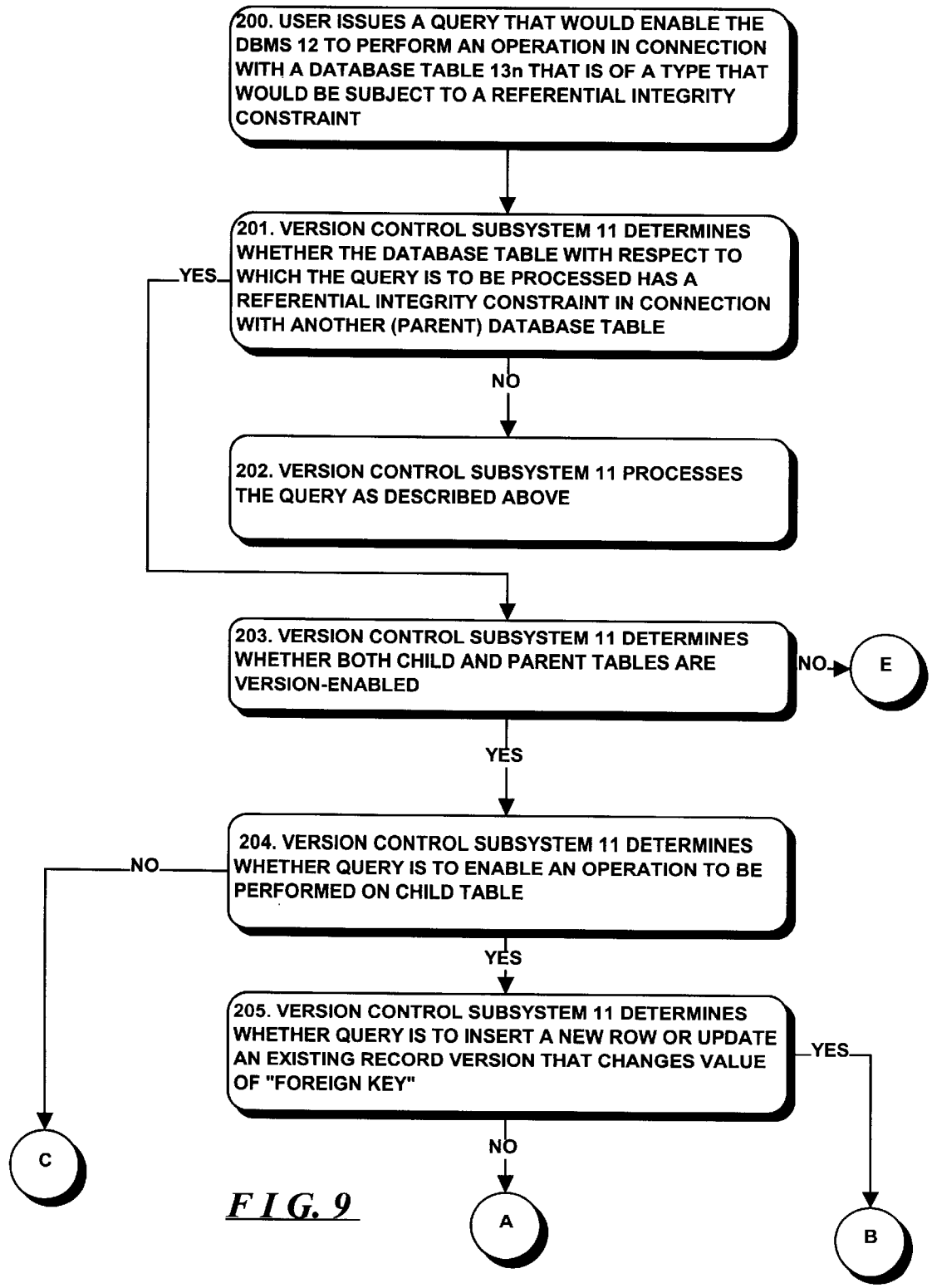
Figure 9A:
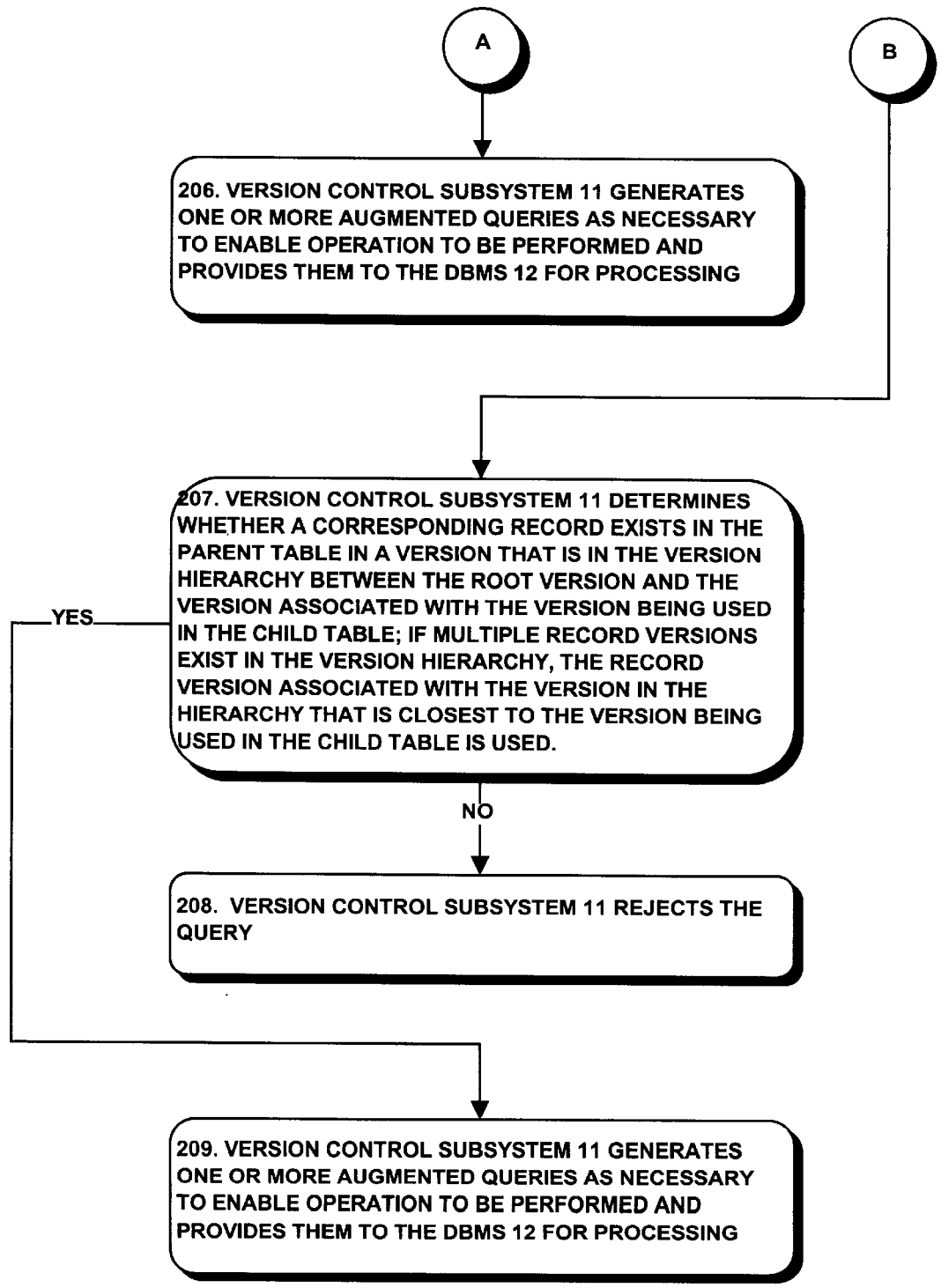
Figure 9B:
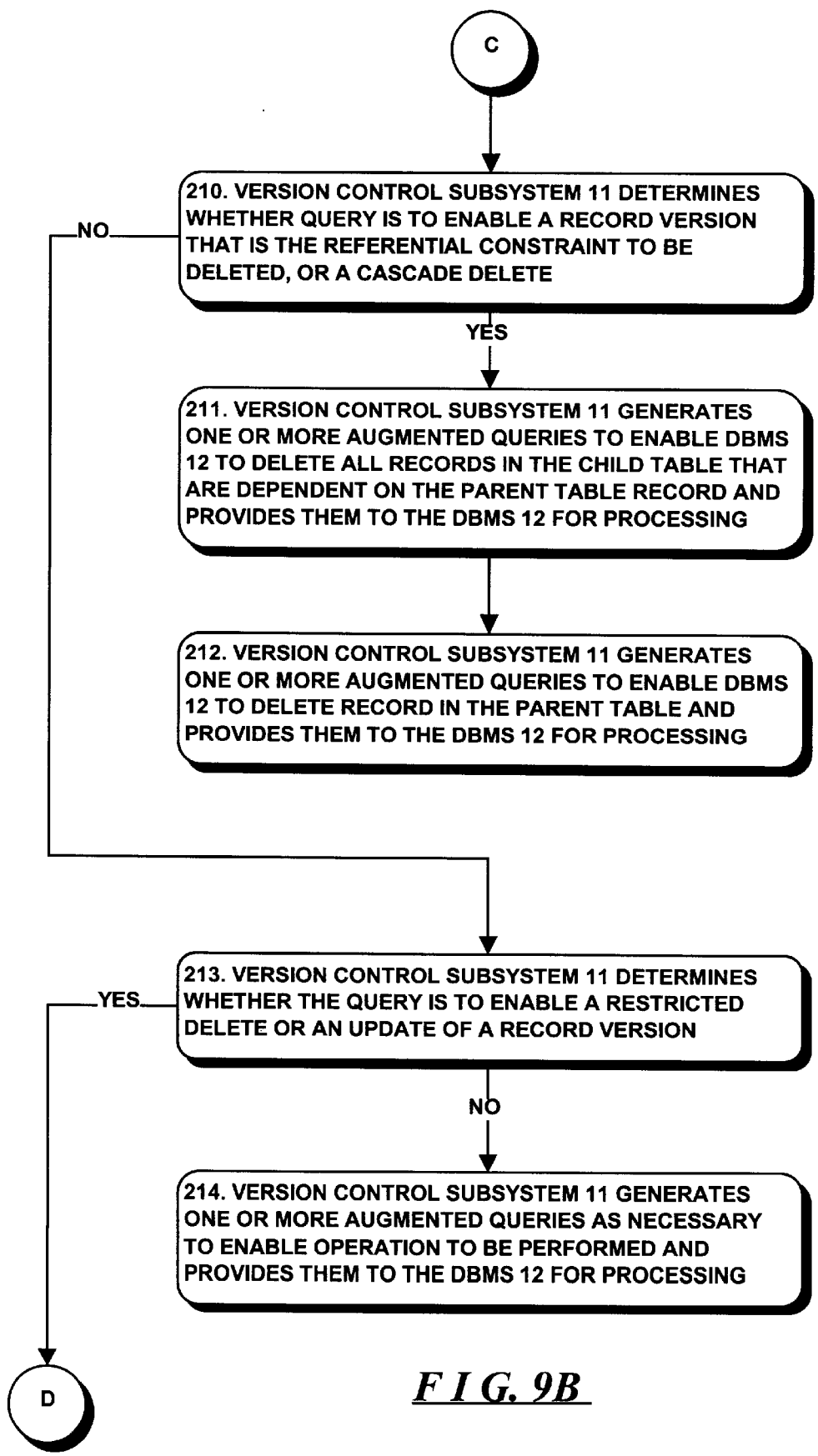
Figure 9C:
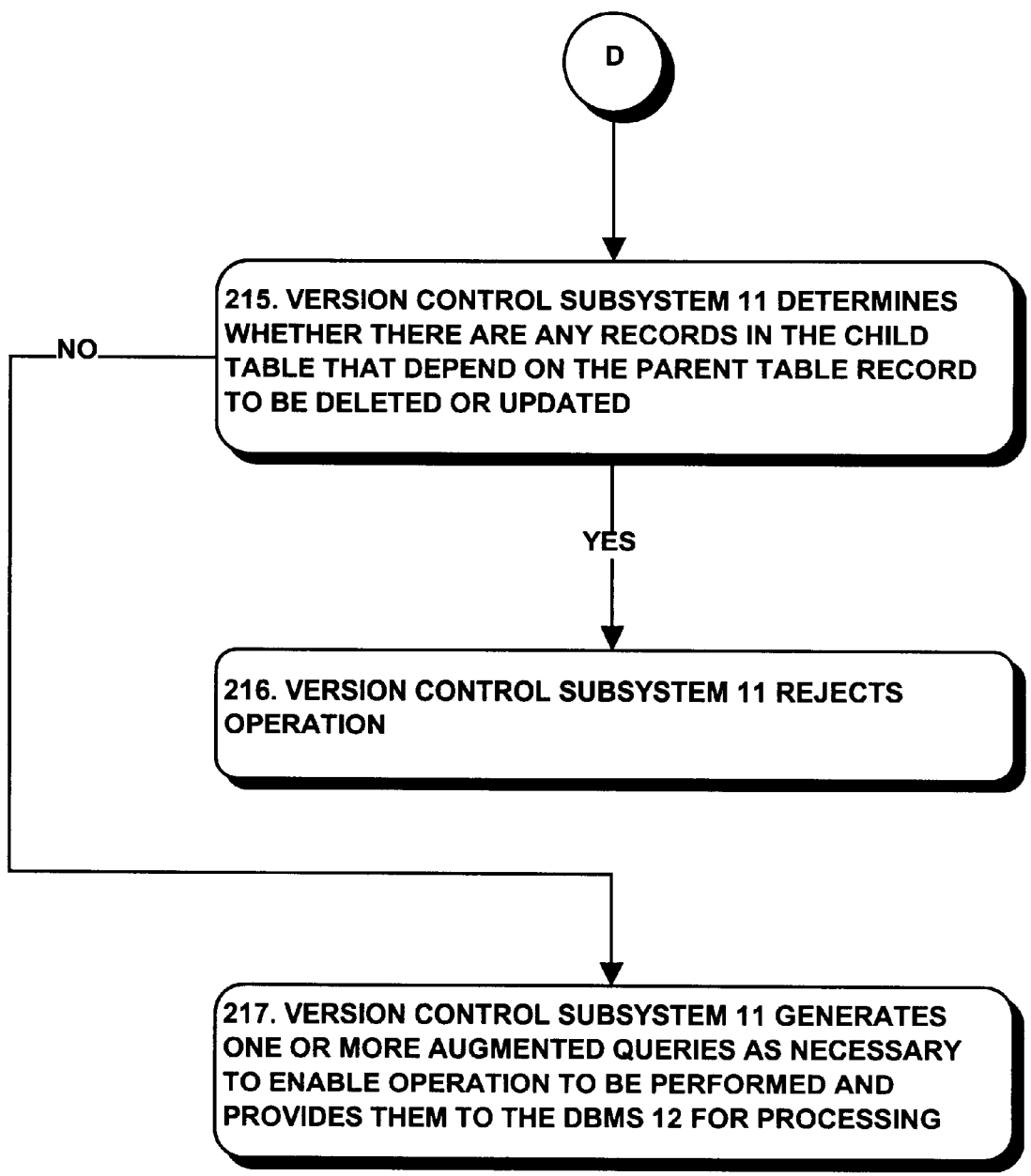
Figure 9E:
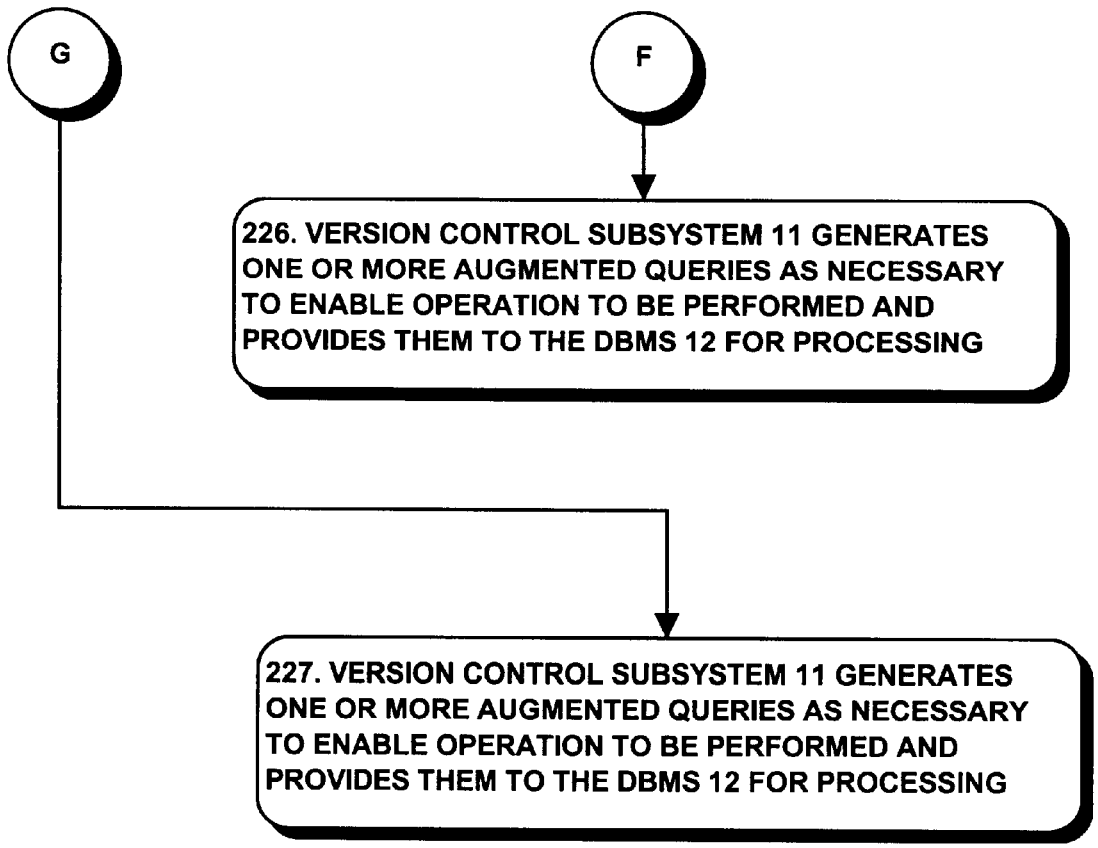

The version control subsystem 11 provides several facilities for use in connection with the state hierarchy as described above, which facilities will be described in connection with the flow charts depicted in FIGS. 6 through 9. Generally, FIG. 6 depicts a flow chart of operations performed by the version control subsystem 11 in connection with a conflict resolution operation, FIG. 7 depicts a flow chart of operations performed in connection with a post operation, FIG. 8 depicts a flow chart of operations performed in connection with a refresh operation and FIG. 9 depicts a flow chart of operations performed in connection with enforcement of referential constraints as between two database tables 13n and 13n'.

Generally, the version control subsystem 11 will deem a conflict to exist as between a parent state and its child state in connection with a record if the record that is visible in the last version of the parent state differs from the record that is visible in the last version of the child state. For example, with reference to FIG. 5, if a record that is visible in state B (that is, version 7) differs from the same record that is visible in state A (that is, version 5) the version control subsystem 11 will deem a conflict to exist therebetween. It will be appreciated that a conflict may arise because (i) a record version exists for version 5, but not version 7. That is, a row 20(i) will exist which has "5" in its version identifier field 22, but no row will exist which has "7" in its version identifier field 22. It will be appreciated that, in that case, when a user is using state B, user data for the record will be retrieved from a record version for version 1 or 2, that is, a row that has "1" or "2" in its version identifier field 22;

(ii) a record version exists for version 7, but not version 5. That is, a row 20(i) will exist which has "7" in its version identifier field 22, but no row will exist which has "5" in its version identifier field 22. It will be appreciated that, in that case, when a user is using state A, user data for the record will be retrieved from a record version for version 1, that is, a row that has "1" in its version identifier field 22;

(iii) a record version exists for version 2, but not version 5. That is, a row 20(i) will exist which has "2" in its version identifier field 22, but no row will exist which has "5" in its version identifier field 22. It will be appreciated that, in that case, when a user is using state A, user data for the record will be retrieved from a record version for version 1, that is, a row that has "1" in its; version identifier field 22, and when a user is using state B, user data for the record will be retrieved from a record version for version 2, that is, a row that has "2 in its version identifier field 22; and (iv) a record version exists for version 7, but not version 5. That is, a row 20(i) will exist which has "7" in its version identifier field 22, and a row 21 (i') will exist which has "5" in its version identifier field 22.

During a conflict resolution operation initiated by a user, if the version control subsystem 11 determines that a conflict exists in connection with a record, it will allow the user to select one of the record versions associated with the last of the versions in the parent state and child state in which the record was modified, or a base record version, to resolve the conflict. The base record version may comprise, for example, the record version associated with the first version of the database table in the parent state, the record version associated with the last version of the database table in the parent state's parent state (if any), or any other convenient record version. When the user selects the record version, the version control subsystem 11 will copy the user data from the fields 21 (j) of the selected record version into one (if the user selects the version of the record associated with the last version in the parent or child state in which the record was modified) version or both (if the user selects the base version) of the record version associated with the last version in both the parent and child state, in the process creating new record versions therefor in those versions if necessary. In addition, the version control subsystem 11 will load a synchronization value in the synchronize fields. 24 of those record versions thereby to indicate that the two record versions are synchronized. The version control subsystem 11 stores the same synchronization value in both record versions. The synchronization value may differ as among records for which conflicts are resolved during the conflict resolution operation, or it may be the same, but if it is the same, it will preferably differ as among different conflict resolution operations. If a record version is later modified, the synchronization value in the modified version is reset, so that the record versions will no longer be indicated as being synchronized. The version control subsystem 11 can determine whether two record versions in two states are synchronized by determining whether the synchronization values in their synchronize field 24 are the same.

With this background, operations performed by the version control subsystem 11 in connection with detecting and resolving conflicts will be described in connection with the flowchart depicted in FIG. 6. With reference to FIG. 6, when a user notifies the version control subsystem 11 that he or she wishes to perform a conflict detection and resolution operation in connection with a database table as between one state and that state's parent state (step 150), the version control subsystem 11 generates one or more queries to enable the DBMS 12 to retrieve all record versions that have been modified, that is, added, updated or deleted, in the child state and that have been modified in the parent state in a version that was created in the parent state after the child state was created (step 151). The queries are such as to provide that, if multiple record versions associated with the versions in the parent state satisfy the query, the record version associated with the latest version will be returned. In addition, the version control subsystem 11 generates one or more queries to enable the DBMS 12 retrieve, for each record for which a record version is returned in response to the query generated in step 151, a base record version which may comprise, for example, the record version associated with the earliest version, in the series of states to the root state, in which the record was added.

After the version control subsystem 11 receives, for each record for which a conflict exists, that is, for each record for which record versions are received in response to a query generated in step 151, the three record versions from the DBMS 12, it provides them to the user (step 152) and allows the user to select a record version to resolve the conflict(step 153). If, for a record, the user selects the latest record in the child state, the version control subsystem 11 generates one or more queries to enable the DBMS to copy user data from the record version associated with the latest version of the child state to the record version associated with the latest version of the parent state, insert the version identifier of the latest version of the child state in the next version identifier field 23 of the record version of the latest version of the parent state, thereby to chain the record versions together, and provides the queries to the DBMS 12 for processing (step 154). In addition, the version control subsystem 11 generates one or more queries to enable the DBMS to store a synchronization value in the synchronize fields 24 of the record versions associated with the latest versions of both the parent and child states (step 155).

Returning to step 153, if the user in that step selects the latest version in the parent state, the version control subsystem 11 sequences to a step 156 in which it generates one or more queries to enable the DBMS to copy user data from the record version associated with the latest version of the parent state to the record version associated with the latest version of the child state, insert the version identifier of the latest version of the child state in the next version identifier field 23 of the record version of the latest version of the parent state, thereby to chain the record versions together, and provides the queries to the DBMS 12 for processing. Thereafter, the version control subsystem 11 sequences to step 155 to generate one or more queries to enable the DBMS to store a synchronization value in the synchronize fields 24 of the record versions associated with the latest versions of both the parent and child states.

Returning to step 153, if the user in that step selects the base version, the version control subsystem 11 sequences to a step 157 in which it generates one or more generates one or more queries to enable the DBMS to copy user data from the base version associated to the record version associated with the latest versions of both the parent state and child state, insert the version identifier of the latest version of the child state in the next version identifier field 23 of the record version of the latest version of the parent state, thereby to chain the record versions together, and provides the queries to the DBMS 12 for processing. Thereafter, the version control subsystem 11 sequences to step 155 to generate one or more queries to enable the DBMS to store a synchronization value in the synchronize fields 24 of the record versions associated with the latest versions of both the parent and child states.

In each case, following step 155, the version control subsystem 11 determines whether there are any additional records for which a conflict exists (step 158). If so, the version control subsystem 11 returns to step 153 to enable the user to select a record version for the next record, and selective performs steps 154 through 157 in connection therewith. The version control subsystem 11 selective performs steps 154 through 158 in connection with each record for which a conflict exists to permit the user to resolve the conflict. After the user has resolved the conflicts for all of the records, the version control subsystem 11 can exit the conflict resolution operation (step 159).

In a further enhancement, the version control subsystem 11 allows a child state to be "refreshed" with data from its parent state and data to be "posted" from a-child state to its parent state. When a child state is refreshed, updates that have been made to the parent state, including both records that have been added since the child state was created as well as updates in the parent state to records that existed when the child state was created, or since the last refresh operation, are made visible in the child state. In connection with refreshing a child state with data from its parent state, the version control subsystem 11 makes use of data from record versions that are associated with or otherwise visible in the last version in the parent state. Thus if, for example, and with reference to FIG. 5, updates have been made to version 5 in state A, following a refresh operation in connection with state B, those updates will be visible in version 7.

On the other hand, when data is posted from a child state to its parent state, the version control subsystem 11 makes use of a version in the child state as selected by the user, with the post being to the last version in the parent state. The post operation differs from conflict resolution as described above in connection with FIG. 6 in that, for all of the records for that a conflict exists, the data is copied from the row associated with the child version to the row associated with the last version of the parent state. In addition, the row associated with the version of the record in the child version is deleted. The refresh operation differs from conflict resolution in that, for all records for that a conflict exists, the data is copied from the row associated with the last version of the parent state to the row associated with the last version of the child state. In both types of operations, the row associated with the last version in the child state is linked to the row associated with the last version of the parent state by adding the child version's version identifier to the next version identifier field 23 of the row associated with the last version of the parent state if it is not already there. The version control subsystem 11 performs both post and refresh operations at the request of a user.

Accordingly, and with reference to FIG. 7, during a post operation, when the user notifies the version control subsystem 1-1 that he or she wishes to initiate a post operation in connection with a child state and its parent state (step 170), the version control subsystem 11 performs a conflict resolution operation in connection with the child state and the parent state as described above in connection with FIG. 6 (step 171). Thereafter, the version control subsystem 11 generates one or more queries to enable the DBMS 12 to copy the user data from the latest version of all records in the latest version of the child state which have been modified since the last post operation into record versions associated with the latest version of the parent state, and provides them to the DBMS 12 for processing (step 172).

The version control subsystem 11 then generates one or more queries to enable the DBMS 12 to insert the version identifier of the latest version of the child state into the record versions in which user data was copied in step 172, and provides them to the DBMS 12 for processing (step 173), thereby to enable the latest version in the child state to be linked or chained to the latest version in the parent state. In addition, for each of the record versions in both the parent and child states for which data-was copied in step 172, the version control subsystem 11 synchronizes the two record versions by generating one or more queries to enable the DBMS 12 to store a synchronization value in their respective synchronize fields 24. The synchronization value will be the same for both record versions associated with each record, that is, for both the record version associated with the latest version in the parent state and the record version associated with the latest version in the child state (step 174), thereby to indicate that the two record versions are synchronized. The synchronization value may, but need not differ as among the record versions associated with the same record. However, the synchronization value or values which are used during one post operation will preferably differ from the value or values which are used during other post operations. Thereafter, the version control subsystem 11 stores a list of version identifiers of record versions in the child state from which data was copied in step 172 (step 175).

With reference to FIG. 8, during a refresh operation in connection with a database table 13n, when the user notifies the version control subsystem 11 that he or she wishes to initiate a refresh operation in connection with a child state and its parent state (step 180), the version control subsystem 11 performs a conflict resolution operation in connection with the conflicting records in the latest versions of the database table 13*n* in both the parent and child states as described above in connection with FIG. 6 (step 181).

Thereafter, the version control subsystem 11 updates the version hierarchy information for the child state to include all versions that were created in the parent state after the child state was created (step 182). Using the example in FIG. 5 in which the parent state includes versions 1, 3 and 5, and the child state B includes versions 2 and 7, the version hierarchy information for the child state will comprise the series of versions 1, 3, 5, 2, 7, effectively making version 2 a child of version 5 instead of version 3. This will automatically make visible in the child state all of the changes that have been made to database table 13*n* the parent state since the creation of the child state. Thus, if a user operating with the child state issues a query to retrieve user data from a record having record versions associated with versions 1 and 5 (that is, the database table 13*n* contains a record version whose version identifier field 22 identifies version 1 and another record version whose version identifier field identifies version 5), and not version 2 or 7, the user data will be retrieved from the record version associated with version 5, not the record version associated with version 1, which would have been the case prior to the refresh operation, or version 3. Accordingly, the child state will be "refreshed" with updates made to versions the parent state created after the child state was established.

On the other hand, if the record has versions associated with both version 1 and 5 (that is, the first and last versions in the parent state A) and version 2 (the first version in the child state B), it will be appreciated that, during the conflict resolution operation (step 181), the user will select one of the three versions to be used to resolve the conflict, after which the user data in the record version associated with version 5 will be updated if necessary to correspond to that of the selected version. In addition, a record version will be established associated with version 7 (the last version in the child state B) whose user data will correspond to that of the selected version. In that case, if a user operating with the child state issues a query to retrieve user data from that record, the user data will be retrieved from the record version associated with version 7. Accordingly, in this case as well, if a record is retrieved from both the child state and the parent state immediately after the refresh operation, the same user data will be retrieved, although, it will be appreciated, the user data will be retrieved from record versions associated with the last versions 5 and 7 in the respective states A and B.

In addition, the version control subsystem 11 generates one or more queries to chain each record version whose user data was posted from the child state into the parent state, as identified by the synchronization values in their synchronize fields 24, by storing the version identifier for the child version in the next version identifier field 23 of the respective record version associated with the parent state (step 183). When two record versions for a record are synchronized, the version control subsystem 11 can also use the synchronization values to determine that they are not both returned in response to an augmented query that it issues to the DBMS 12, and so step 183 can ensure that both record versions are not returned by the DBMS 12 in connection with an augmented query that is executed in connection with the child state.

Finally, the version control subsystem 11 establishes a new child state in the parent state (step 184). The new child state is provided so that, if the database table 13*n* is updated in the parent state, those updates will not be visible in the child state until a subsequent refresh operation is performed.

As noted above, the version control subsystem 11 facilitates versioning of the database 13 on a table-by-table basis. That is, a user can enable the version control subsystem 11 to allow for versioning of one or more of the database tables as described above and contemporaneously not allow for versioning of other'database tables. In that connection, a problem can arise if, for example, one database table includes information that is also referenced in another database table. Using the above example, in which a database table 13*n* is an employee database table, with the records identifying the names, employee numbers, addresses, departments, etc., for the respective employees, the database 13 may also have a company structure database table 13*n*' that identifies the company's departments. In that case, it may be undesirable to allow a user to, for example, delete a row of the database table 13*n*' that identifies a department for that there is at least one employee in the database table 13*n*. In that case, if a user wishes to delete a row associated with one department in the database table 13*n*', he or she would need to update all of the records in the database table 13*n* to either change the department identified in those records before the row could be deleted, or to delete those records. This may be useful if, for example, the departmental structure of the company is being modified. Alternatively, the user would need to authorize the DBMS 12 to delete all of the records of the employee database 13*n* that identify the department record that is being deleted in company structure database table 13*n*'; this may be useful if, for example, the department is being eliminated and the employees discharged. This serves to ensure referential integrity as between the database tables 13*n* and 13*n*'.

Several problems arise, however, if the version control subsystem 11 is versioning one or more of the database tables 13*n* in the database 13. Generally, a problem will not arise if the version control subsystem 11 is not versioning either of a pair of database tables for which a referential integrity constraint exists. Neither will a problem arise if the version control subsystem 11 has versioned, for example, one of the database tables for that a referential integrity constraint exists but not the other such tables. Referring to the example in the preceding paragraph, if, for example, the employee database table 13*n* has been versioned, but the company structure database table 13*n*' has not been versioned, if a user wishes to delete a row from the company structure database table 13*n*'associated with a department, operations as described above can be performed in connection with all of the versions contained in the employee database table 13.

On the other hand, if the version control subsystem 11 has versioned both the employee database table 13*n* and the company structure database table 13*n*', since the version structure of the employee database table 13*n*, as represented by its version tree, need have no relation to the version structure in the company structure database table 13*n*', and if the same department was identified in two or more versions in the company structure database table 13*n*', deleting a row associated with one version would delete the department for that version but not for other versions. Accordingly, if the row associated with a department is deleted in one version of the company structure database table 13*n*', it would be undesirable to, for example, delete the rows of the employee database table 13*n* for employees whose records relating to that department, since the department may still exist in rows of other versions of the company structure database table 13*n*'. Similar operations are performed in connection with any type of query that is subject to a referential integrity constraint.

In the following, two tables 13n and 13n' will be considered to have a parent and child referential integrity constraint relationship if, for child table 13n, the value(s) that are contained in a particular field 21(j) of its rows 20(i) must correspond to the value contained in a particular field 21 (j') in at least one row 20(i') of the parent table 13n'. In addition, the referential integrity constraint relationship will be considered a "foreign key" relationship if the field 21 0') in the parent table 13n' is a key field in the parent table 13n', and in that case the "j-th" field of the child table 13n will be referred to as the foreign key field.

Accordingly, with this background, operations performed by the version control subsystem 11 in connection with enforcement of a referential integrity constraint will be described in connection with FIG. 9. With reference to FIG. 9, when the user issues a query that would enable the DBMS 12 to perform an operation in connection with a database table 13n that is of a type that would be subject to a referential integrity constraint (step 200), the version control subsystem 11 initially determines whether the database table with respect to that the query is to be processed has a referential integrity constraint in connection with another database table (step 201). If the version control subsystem 11 makes a negative determination in step 201, the version control subsystem 11 will process the query as described above (step 202).

On the other hand, if the version control subsystem 11 makes a positive determination in step 201, that will be the case if the database table with respect to that the query is to be processed has a referential integrity constraint in connection with another database table, it will determine whether both database tables are versioned (step 203). If the version control subsystem 11 makes a positive determination in step 203, the version control subsystem 11 will determine whether the query is to enable an operation to be performed on the child table. If the version control subsystem 11 makes a positive determination in step 204, it determines whether the query is to insert a new row in the child table, or to update an existing record version in a manner which would change the value of a foreign key, that is, data in a field that is referenced from the parent table (step 205). If the version control subsystem 11 makes a negative determination in step 205, no problem will result if the operation to be enabled by the query is performed, and so the version control subsystem 11 generates one or more augmented queries as necessary to enable the operation to be performed, and provides them to the DBMS for processing (step 206).

Returning to step 205, if the version control subsystem 11 makes a positive determination in that step, a problem can arise since it will need to ensure that the parent table contains a record version, in the version for which the row is to be inserted or updated in the child table, that is in the version hierarchy that contains the foreign key. That is, with reference to FIG. 5, if the query is for state B, the version control subsystem 11 will need to verify that, in the set of versions of parent table 13n' in root state A and state B, one record version contains the value to be provided in the foreign key field of the child table 13n. Thus, for example, if both the parent database table 13n' and the child database table 13n have version hierarchies as shown in FIG. 5, and if the user wishes to insert a new record version in the version associated with state B of the child table, or update an existing record version so as to change the value of the foreign key field, version control subsystem 11 will need to ensure that the value of the foreign key field is also in a record version that is in at least one of the versions associated with versions 7, 2, or I of the parent table 13n', that is, the version hierarchy of the last version of parent table 13n' in state B. Accordingly, the version control subsystem 11 will generate one or more queries for processing by the DBMS to enable it to make that determination (step 207). If the version control subsystem 11 makes a negative determination in step 207, it will reject the query (step 208). On the other hand, if the version control subsystem 11 makes a positive determination in step 207, it will generate one or more augmented queries to enable the operation specified in the query received in step 200 to be performed, and provides them to the DBMS 12 for processing (step 209).

Returning to step 204, if the version control subsystem 11 makes a negative determination in that step, which will occur if the query received in step 200 is to enable an operation to be performed in connection with the parent table 13n', the version control subsystem 11 will determine whether the query is to enable deletion of a record version froth the parent table 13n' that contains, in a user data field 21 ('), a value that operates as a referential constraint in a child table 13n (that is, a value that is in one or more record versions in the child table 13(n) in respective user data fields 21(j) for which the value must also be in the field 21(j') of the record version in the parent table 13n'), or if the query is to enable a cascade delete operation to occur (step 21(j). In that case, if the version control subsystem 11 makes a positive determination in step 210, it will generate one or more augmented queries to enable the DBMS 12 to delete the records in the child table 13n that are dependent on the record version in the parent table that is to be deleted, and provides them to the DBMS 12 for processing (step 211). Thereafter, the version control subsystem 11 generates one or more augmented queries to enable the DBMS to delete the record version in the parent table and provides them to the DBMS 12 for processing (step 212).

Returning to step 210, if the version control subsystem 11 makes a negative determination in that step, it sequences to step 213 to determine whether the query received in step 200 is to enable a restricted delete or an update of a record in a version in the parent table 13n'. If the version control subsystem 11 makes a negative determination in step 213, which may occur if, for example, the query is to enable a new record to be inserted in a version in the parent table, it generates one or more augmented queries as necessary to enable the operation to be performed an provides them to the DBMS 12 for processing (step 214).

Returning to step 213, if the version control subsystem 11 makes a positive determination in that step, determines whether there are any records in the child table 13n that depend on the record version in the parent table 13n' that is to be deleted (step 215). In that operation, the version control subsystem 11 will generate one or more queries to query the DBMS as to whether such records exist for processing by the DBMS. If the version control subsystem 11 determines that such a record exists, it rejects the query (step 216). On the other hand, if the version control subsystem 11 determines that no such records exist, it generates one or more augmented queries as necessary to enable the operation specified in the query received in step 200 to be performed, and provides them to the DBMS 12 for processing.

Returning to step 203, if the version control subsystem 11 makes a negative determination in that step, which will be the case if the parent and child tables are not both version-enabled, it will sequence to step 220 to determine whether the child version is version-enabled, but the parent table is not. In that case, the records in the parent table are effectively in every version represented by the record versions in the child table. If the version control subsystem 11 makes a positive determination in that step, the version control subsystem 11 determines whether the operation to be performed in response to the query received in step 200 is to be performed in connection with the child table (step 221). If the version control subsystem 11 makes a negative determination in step 221, which will be the case if the operation is to be performed in connection with the parent table, it sequences to step 210 to perform the operations described above in connection with steps 210 through 217 in connection with the parent table.

On the other hand, if the version control subsystem 11 makes a positive determination in step 221, which will be the case if the operation is to be performed in connection with the child table, the version control subsystem 11 it determines whether the query is to insert a new row in the child table, or to update an existing record version in a manner which would change the value of a foreign key, that is, data which is referenced from the parent table (step 222). If the version control subsystem 11 makes a negative determination in step 222, the version control subsystem 11 generates one or more augmented queries as necessary to enable the operation to be performed, and provides them to the DBMS for processing (step 223).

Returning to step 222, if the version control subsystem 11 makes a positive determination in that step, it will determine whether a corresponding record exists in the parent table for the generate one or more queries for processing by the DBMS to enable it to make that determination (step 224). If the version control subsystem 11 makes a negative determination in step 224, it will reject the query (step 225). On the other hand, if the version control subsystem 11 makes a positive determination in step 224, it will generate one or more augmented queries to enable the operation specified in the query received in step 200 to be performed, and provides them to the DBMS 12 for processing (step 226). It will be appreciated that the operations performed in connection with steps 222 through 226 are analogous to the operations performed in connection with steps 205 through 209, except that in step 224 (which corresponds to step 207), the determination is made only in relation to the single version in the parent table.

Returning to step 220, if the version control subsystem 11 makes a negative determination in that step, which will be the case if neither the parent table nor the child table is version enabled, the version control subsystem 11 will sequence to step 227 to generate one or more augmented queries to enable the operation specified in the query received in step 200 to be performed, and provides them to the DBMS 12 for processing.

The invention provides a number of advantages. In particular, the invention provides a version control subsystem 11 that facilitates versioning of a database table 13$n$ in a manner that does not require modification of a DBMS 12. Versioning is essentially provided on a record-by-record basis, that can reduce the amount of storage space that might be required if versions were on a table-by-table basis. Such record-level versioning is facilitated by version control subsystem 11 merely by adding additional attributes to the database table 13$n$, that, in turn, facilitate access by a conventional DBMS using queries generally as provided by a user 14, but augmented as necessary to identify appropriate record versions. Unlike a check-out/check-in scheme, no portion of the database is unavailable to any of the users, since the version control subsystem 11 keeps track of the particular version or versions that a user is using at any point in time. In addition, the version control subsystem 11 facilitates creation of a hierarchy of versions, that is generally not possible with other schemes, such as check-out/check in.

In addition, the version control subsystem 11 facilitates creation of a hierarchy of database states, which is also generally not possible with other schemes, and association of versions of one or more database tables 13$n$ to the respective states. Thus, using the above example in which a database 13 is used in connection with design of a new airport, the version control subsystem 11 allows for, from the root state representing the airport as a whole, child states in which users can associate, for example, design of respective terminals of the airport, and, as children thereof, design of respective electric power distribution systems, water distribution systems, of the respective terminal.

In addition, since records associated with all versions of a database table 13$n$ are stored in the database table 13$n$, the version control subsystem 11 makes the early identification of conflicts as between versions and reconciliation of conflicts as they are identified relatively easy, which can be advantageous since a large number of conflicts which may accumulate over a long period of time can potentially lead to a large loss of work. Conflicts can be easily be identified and resolved relatively frequently, in contrast to a check-out/check-in arrangement in which conflicts are not identified until a checked-out copy is to be checked in, which may be a relatively long time after the copy is checked out. In addition, since conflict detection and resolution is on a row-by-row basis, data sharing concurrency between users of a database can be enhanced over, for example, check-out/check-in arrangements, in which checked-out tables are in separate files from those for the live database. In addition, if a row 20($i$) in a database table 13$n$ is locked while the table 13$n$ is version-enabled, conflicts in connection therewith can be avoided altogether.

Furthermore, the version control subsystem 11 facilitates posting of data from a version in a child state to a parent state and refreshing of a version in a child state with data in a parent state in a state hierarchy. This makes it possible, for example, to maintain separate versions of a database table 13$n$ in diverse states over a long period of time, and periodically allow changes made in versions in the parent and/or child state to be made visible in the other state. Check-out/check-in arrangements do not provide corresponding mechanisms.

In addition, the version control subsystem 11 facilitates maintenance of referential integrity constraints among database tables, some or all of which may be versioned.

It will be appreciated that a number of modifications may be made to the version control subsystem 11 as described above. For example, although the version control subsystem 11 has been described in connection with a relational database arrangement, it will be appreciated that the version control subsystem 11 may be useful in connection with other types of database arrangements.

The components of the system 10 as described above may comprise any suitably programmed digital data processing apparatus or special purpose hardware. A digital data processing apparatus may include an individual computer or a plurality of computers networked together. The computer or computers may comprise, for example, personal computers or personal computer, minicomputers or mainframes. Individual users may interact with the computers through any convenient user interface, that may include video displays to facilitate display of data to the respective users and user input devices such as keyboards, mice, light pens and other such devices to receive input, including queries, from a user. In addition, although the version control subsystem 11 has been described as receiving queries from, and providing data to, users, it will be appreciated that those users may include human users or users in the form of application programs.

It will be appreciated that a system in accordance with the invention can be constructed in whole or in part from special purpose hardware or a general purpose computer system, or any combination thereof, any portion of that may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) that may be connected directly to the system or that may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method for providing version control of a database, the method comprising:
   receiving a query specifying a modification to be performed on one of a plurality of records of the database;
   generating, based on the received query, an augmented query specifying a version of the one record and the manipulation to be performed on the version of the one record; and
   causing the augmented query to be processed thereby performing the manipulation on the version of the one record.

2. A method of according to claim 1, wherein the includes one of modification, addition, and deletion.

3. A method of according to claim 1, wherein the records are associated with respective versions, each of the records includes:
   a version identifier field for storing the version of the respective record; and
   a next version identifier field for storing at least one of another version of the respective record and a default value.

4. A method according to claim 3, wherein the version identifier fields and the next version identifier fields effect a tree structure of nodes representing corresponding versions of the records.

5. A method according to claim 3, further comprising:
   determining whether the version of the one record exists; and
   instructing establishment of a new record based upon the determining step, the new record including a field for specifying a corresponding version identifier.

6. A method according to claim 1, wherein each of the records includes a flag field for designating deletion, the method further comprising:
   determining whether the version of the one record exists; and
   if the query specifies a deletion, instructing setting of the flag field of the one record.

7. A method according to claim 1, further comprising:
   storing identification information associated with the version of the one record to define a state among a plurality of states of the database.

8. A method according to claim 7, wherein the states are in a hierarchical relationship.

9. A method according to claim 1, wherein the one record has multiple versions, the method further comprising:
   providing access to a pre-designated version of the versions in response to the query.

10. A method according to claim 1, wherein the one record has multiple versions, the method further comprising:
    identifying the version among a plurality of versions of the one record to satisfy the query.

11. A method according to claim 1, wherein the database includes a plurality of tables containing the records, the further comprising:
    specifying on a table-by-table basis whether more than one version of the records can exist.

12. A computer-readable medium bearing instructions for providing version control of a database, said instruction, being arranged, upon execution, to cause one or more processors to perform the method of claim 1.

13. A system for providing version control of a database, the system comprising:
    means for receiving a query specifying a modification to be performed on one of a plurality of records of the database;
    means for generating, based on the received query, an augmented query specifying a version of the one record and the manipulation to be performed on the version of the one record; and
    means for causing the augmented query to be processed thereby performing the manipulation on the version of the one record.

14. A system of according to claim 13, wherein the manipulation includes one of modification, addition, and deletion.

15. A system of according to claim 13, wherein the records are associated with respective versions, each of the records includes:
    a version identifier field for storing the version of the respective record; and
    a next version identifier field for storing at least one of another version of the respective record and a default value.

16. A system according to claim 15, wherein the version identifier fields and the next version identifier fields effect a tree structure of nodes representing corresponding versions of the records.

17. A system according to claim 15, further comprising:
    means for determining whether the version of the one record exists; and
    means for instructing establishment of a new record based upon the determining step, the new record including a field for specifying a corresponding version identifier.

18. A system according to claim 13, wherein each of the records includes a flag field for designating deletion, the system further comprising:
    means for determining whether the version of the one record exists; and means for instructing setting of the flag field of the one record upon the query specifying a deletion.

19. A system according to claim 13, further comprising:
    means for storing identification information associated with the version of the one record to define a state among a plurality of states of the database.

20. A system according to claim 19, wherein the states are in a hierarchical relationship.

21. A system according to claim 13, wherein the one record has multiple versions, the system further comprising:

means for providing access to a pre-designated version of the versions in response to the query.

22. A system according to claim 13, wherein the one record has multiple versions, the system further comprising:

means for identifying the version among a plurality of versions of the one record to satisfy the query.

23. A system according to claim 13, wherein the database includes a plurality of tables containing the records, the further comprising:

means for specifying on a table-by-table basis whether more than one version of the records can exist.

* * * * *